US012526800B2

(12) United States Patent
Dutta et al.

(10) Patent No.: US 12,526,800 B2
(45) Date of Patent: Jan. 13, 2026

(54) RESOURCE INFORMATION FORWARDING FOR DISTRIBUTED SIDELINK

(71) Applicant: QUALCOMM Incorporated, San Diego, CA (US)

(72) Inventors: Sourjya Dutta, San Diego, CA (US); Tien Viet Nguyen, Bridgewater, NJ (US); Gabi Sarkis, San Diego, CA (US); Shuanshuan Wu, San Diego, CA (US); Kapil Gulati, Belle Mead, NJ (US); Gene Wesley Marsh, San Diego, CA (US); Shailesh Patil, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 17/895,908

(22) Filed: Aug. 25, 2022

(65) Prior Publication Data

US 2023/0064669 A1 Mar. 2, 2023

Related U.S. Application Data

(60) Provisional application No. 63/238,045, filed on Aug. 27, 2021.

(51) Int. Cl.
*H04W 72/20* (2023.01)
*H04W 74/0808* (2024.01)
(52) U.S. Cl.
CPC ....... *H04W 72/20* (2023.01); *H04W 74/0808* (2013.01)

(58) Field of Classification Search
CPC ... H04W 72/20; H04W 74/0808; H04W 4/40; H04W 88/04; H04W 72/02; H04W 72/25; H04W 72/40
See application file for complete search history.

(56) References Cited

U.S. PATENT DOCUMENTS

2022/0116950 A1* 4/2022 Zhao ................. H04W 72/0446
2022/0132575 A1* 4/2022 Wu .................... H04W 74/0825
(Continued)

OTHER PUBLICATIONS

International Search Report and Written Opinion—PCT/US2022/075501—ISA/EPO—Jan. 4, 2023 (2107705WO).
(Continued)

*Primary Examiner* — Abdullahi Ahmed
(74) *Attorney, Agent, or Firm* — Holland & Hart LLP

(57) ABSTRACT

Methods, systems, and devices for wireless communications are described. Generally, the described techniques provide for regulating a size of a resource information forwarding message to balance the overhead associated with transmitting the resource information forwarding message with the usefulness of the resource information forwarding message. A first user equipment (UE) may receive a sidelink control information (SCI) message from a third UE indicating resources reserved by the third UE, and it may be appropriate for the first UE to transmit a resource information forwarding message to a second UE indicating the resources reserved by the third UE. As such, the first UE may determine a maximum size of the resource information forwarding message, and the first UE may generate and transmit the resource information forwarding message to the second UE in accordance with the determined maximum size.

28 Claims, 12 Drawing Sheets

(56) References Cited

U.S. PATENT DOCUMENTS

| | | | |
|---|---|---|---|
| 2022/0232585 A1* | 7/2022 | Park | H04W 72/23 |
| 2022/0304032 A1* | 9/2022 | Hahn | H04W 72/20 |
| 2024/0147514 A1* | 5/2024 | Yao | H04W 72/542 |
| 2024/0373442 A1* | 11/2024 | Shin | H04W 72/40 |

OTHER PUBLICATIONS

LG Electronics: "Discussion on Feasibility and Benefits for Mode 2 Enhancements", 3GPP TSG RAN WG1 Meeting #104-e, R1-2101786 (Revision of R1-2100518), 3GPP, Mobile Competence Centre, 650, Route Des Lucioles, F-06921 Sophia-Antipolis Cedex, France, vol. RAN WG1, No. e-Meeting, Jan. 25-Feb. 5, 2021, Jan. 26, 2021, 28 Pages, XP051975888, Sec: 2.1, Sec: 2.2-sub-sec: Q-A1-Q-A5, Sec: 2.3-Q-B1-Q-B5, Sec 3.

Qualcomm Incorporated: "Reliability and Latency Enhancements for Mode 2", 3GPP TSG RAN WG1 Meeting #106-e, R1-2108340, 3GPP, Mobile Competence Centre, 650, Route Des Lucioles, F-06921 Sophia-Antipolis Cedex, France, vol. RAN WG1, No. Aug. 16-Aug. 27, 2021, Aug. 18, 2021, 37 Pages, XP052042146, Sec: 2, Sec: 3, 3.1, 3.2, 3.2.1, Sec: 4, Sec: 6.

* cited by examiner

205 ▮ First transmission with SCI

210 ▨ First sidelink retransmission resource

215 ▦ Second sidelink retransmission resource

200

Initial low R17 adoption rate

Network transitions to mostly R17 UEs

R16 UE

R17 UE

RESOURCE INFORMATION FORWARDING FOR DISTRIBUTED SIDELINK

CROSS REFERENCE

The present application for patent claims the benefit of U.S. Provisional Patent Application No. 63/238,045 by DUTTA et al., entitled "RESOURCE INFORMATION FORWARDING FOR DISTRIBUTED SIDELINK," filed Aug. 27, 2021, assigned to the assignee hereof, and expressly incorporated by reference herein.

FIELD OF TECHNOLOGY

The following relates to wireless communications, including resource information forwarding for distributed sidelink.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). Some wireless communications systems may support sidelink communications between UEs. In such systems, it may be appropriate for UEs to exchange messages to coordinate communications on sidelink resources (e.g., to avoid interference and collisions). Such messages may be referred to as inter-UE coordination messages. Improved techniques for utilizing inter-UE coordination messages may be desirable.

SUMMARY

The described techniques relate to improved methods, systems, devices, and apparatuses that support resource information forwarding for distributed sidelink. The described techniques provide for regulating a size of a resource information forwarding message to balance the overhead associated with transmitting the resource information forwarding message with the usefulness of the resource information forwarding message. A first UE may receive a sidelink control information (SCI) message from a third UE indicating resources reserved by the third UE, and it may be appropriate for the first UE to transmit a resource information forwarding message to a second UE indicating the resources reserved by the third UE (e.g., if the second UE is unable to receive the SCI from the third UE). As such, the first UE may determine a maximum size of the resource information forwarding message, and the first UE may generate and transmit the resource information forwarding message to the second UE in accordance with the determined maximum size.

A method for wireless communication at a first user equipment (UE) is described. The method may include determining a maximum size of a resource information forwarding message to be transmitted to a second UE over a sidelink channel, the resource information forwarding message indicating at least a set of sidelink resources reserved by a third UE, generating the resource information forwarding message in accordance with the determined maximum size, and transmitting the generated resource information forwarding message to the second UE over the sidelink channel.

An apparatus for wireless communication at a first UE is described. The apparatus may include a processor, memory coupled with the processor, and instructions stored in the memory. The instructions may be executable by the processor to cause the apparatus to determine a maximum size of a resource information forwarding message to be transmitted to a second UE over a sidelink channel, the resource information forwarding message indicating at least a set of sidelink resources reserved by a third UE, generate the resource information forwarding message in accordance with the determined maximum size, and transmit the generated resource information forwarding message to the second UE over the sidelink channel.

Another apparatus for wireless communication at a first UE is described. The apparatus may include means for determining a maximum size of a resource information forwarding message to be transmitted to a second UE over a sidelink channel, the resource information forwarding message indicating at least a set of sidelink resources reserved by a third UE, means for generating the resource information forwarding message in accordance with the determined maximum size, and means for transmitting the generated resource information forwarding message to the second UE over the sidelink channel.

A non-transitory computer-readable medium storing code for wireless communication at a first UE is described. The code may include instructions executable by a processor to determine a maximum size of a resource information forwarding message to be transmitted to a second UE over a sidelink channel, the resource information forwarding message indicating at least a set of sidelink resources reserved by a third UE, generate the resource information forwarding message in accordance with the determined maximum size, and transmit the generated resource information forwarding message to the second UE over the sidelink channel.

Some examples of the method, apparatuses, and non-transitory computer-readable medium described herein may further include operations, features, means, or instructions for receiving, from the third UE, a sidelink control information message indicating the set of sidelink resources reserved by the third UE, where transmitting the resource information forwarding message to the second UE includes forwarding the set of sidelink resources reserved by the third UE to the second UE.

In some examples of the method, apparatuses, and non-transitory computer-readable medium described herein, determining the maximum size of the resource information forwarding message may include operations, features, means, or instructions for determining the maximum size of the resource information forwarding message based on a quantity of periodic reservations made by one or more UEs in a sensing window, a ratio of UEs supporting resource information forwarding and other UEs not supporting resource information forwarding detected in the sensing window, a congestion metric calculated based on the sensing window, or a combination thereof.

In some examples of the method, apparatuses, and non-transitory computer-readable medium described herein, determining the maximum size of the resource information forwarding message may include operations, features, means, or instructions for adapting a preconfigured maximum size of the resource information forwarding message to determine the maximum size of the resource information forwarding message based on the quantity of periodic reservations, the ratio of UEs supporting resource information forwarding and other UEs not supporting resource information forwarding, the congestion metric, or a combination thereof.

Some examples of the method, apparatuses, and non-transitory computer-readable medium described herein may further include operations, features, means, or instructions for performing sensing during the sensing window and determining the quantity of periodic reservations made by the one or more UEs, the ratio of UEs supporting resource information forwarding and other UEs not supporting resource information forwarding, or the congestion metric based on performing the sensing during the sensing window, historical information on device capabilities, traffic pattern information, or a combination thereof.

Some examples of the method, apparatuses, and non-transitory computer-readable medium described herein may further include operations, features, means, or instructions for calculating the congestion metric based on measurements performed on sidelink resources in the sensing window or measurements performed on a subset of the sidelink resources in the sensing window dedicated for resource information forwarding measurements.

Some examples of the method, apparatuses, and non-transitory computer-readable medium described herein may further include operations, features, means, or instructions for receiving control information from the UEs supporting resource information forwarding indicating that the UEs support resource information forwarding and determining the ratio of the UEs supporting resource information forwarding and other UEs not supporting resource information forwarding based on receiving the control information. In some examples of the method, apparatuses, and non-transitory computer-readable medium described herein, the control information includes sidelink control information or a medium access control (MAC) control element (CE).

Some examples of the method, apparatuses, and non-transitory computer-readable medium described herein may further include operations, features, means, or instructions for receiving a packet from each UE supporting resource information forwarding, the packet including a layer-2 identifier indicating that the UE supports resource information forwarding. In some examples of the method, apparatuses, and non-transitory computer-readable medium described herein, the layer-2 identifier may be from a set of layer-2 identifiers available to UEs supporting resource information forwarding. In some examples of the method, apparatuses, and non-transitory computer-readable medium described herein, the layer-2 identifier may be a part of an upper-layer configuration or may be preconfigured at UEs supporting resource information forwarding.

In some examples of the method, apparatuses, and non-transitory computer-readable medium described herein, the maximum size of the resource information forwarding message may be preconfigured at the first UE. Some examples of the method, apparatuses, and non-transitory computer-readable medium described herein may further include operations, features, means, or instructions for receiving one or more sets of sidelink control information messages indicating one or more sets of sidelink resources reserved by one or more UEs, the one or more sets of sidelink resources including the set of sidelink resources reserved by the third UE.

In some examples of the method, apparatuses, and non-transitory computer-readable medium described herein, generating the resource information forwarding message may include operations, features, means, or instructions for sorting the one or more sets of sidelink resources reserved by the one or more UEs and generating the resource information forwarding message to indicate at least a first one or more sets of sidelink resources of the sorted sets of sidelink resources.

In some examples of the method, apparatuses, and non-transitory computer-readable medium described herein, sorting the one or more sets of sidelink resources may include operations, features, means, or instructions for sorting the one or more sets of sidelink resources reserved by the one or more UEs based on a time at which each set of sidelink resources may be reserved, a signal strength or quality metric of each sidelink control information message reserving a corresponding set of sidelink resources, a distance between the first UE and a UE of the one or more UEs reserving each set of sidelink resources, or a combination thereof.

Some examples of the method, apparatuses, and non-transitory computer-readable medium described herein may further include operations, features, means, or instructions for identifying resources allocated for transmitting the resource information forwarding message to the second UE and adapting a modulation and coding scheme for generating the resource information forwarding message based on the resources allocated or pre-allocated for transmitting the resource information forwarding message to the second UE.

Some examples of the method, apparatuses, and non-transitory computer-readable medium described herein may further include operations, features, means, or instructions for generating the resource information forwarding message using a fixed modulation and coding scheme, the method further including and adapting a quantity of resources for transmitting the resource information forwarding message to the second UE based on generating the resource information forwarding message using the fixed modulation and coding scheme.

Some examples of the method, apparatuses, and non-transitory computer-readable medium described herein may further include operations, features, means, or instructions for generating the resource information forwarding message based on a fixed, maximum modulation and coding scheme, the method further including and adapting a quantity of resources for transmitting the resource information forwarding message to the second UE based on generating the resource information forwarding message based on the fixed, maximum modulation and coding scheme.

Some examples of the method, apparatuses, and non-transitory computer-readable medium described herein may further include operations, features, means, or instructions for receiving a request from the second UE for the resource information forwarding message, where transmitting the resource information forwarding message to the second UE may be based on receiving the request. In some examples of the method, apparatuses, and non-transitory computer-readable medium described herein, transmitting the resource information forwarding message to the second UE may include operations, features, means, or instructions for autonomously transmitting the resource information forwarding message to the second UE.

A method for wireless communication at a UE is described. The method may include generating, for transmission on sidelink resources, a packet including an indication that the UE supports resource information forwarding and transmitting the generated packet with the indication that the UE supports resource information forwarding.

An apparatus for wireless communication at a UE is described. The apparatus may include a processor, memory coupled with the processor, and instructions stored in the memory. The instructions may be executable by the processor to cause the apparatus to generate, for transmission on sidelink resources, a packet including an indication that the UE supports resource information forwarding and transmit the generated packet with the indication that the UE supports resource information forwarding.

Another apparatus for wireless communication at a UE is described. The apparatus may include means for generating, for transmission on sidelink resources, a packet including an indication that the UE supports resource information forwarding and means for transmitting the generated packet with the indication that the UE supports resource information forwarding.

A non-transitory computer-readable medium storing code for wireless communication at a UE is described. The code may include instructions executable by a processor to generating, for transmission on sidelink resources, a packet including an indication that the UE supports resource information forwarding and transmit the generated packet with the indication that the UE supports resource information forwarding.

In some examples of the method, apparatuses, and non-transitory computer-readable medium described herein, transmitting the packet with the indication that the UE supports resource information forwarding may include operations, features, means, or instructions for transmitting control information in the packet indicating that the UE supports resource information forwarding. In some examples of the method, apparatuses, and non-transitory computer-readable medium described herein, the control information includes sidelink control information or a medium access control (MAC) control element (CE).

In some examples of the method, apparatuses, and non-transitory computer-readable medium described herein, transmitting the packet with the indication that the UE supports resource information forwarding may include operations, features, means, or instructions for transmitting a layer-2 identifier in the packet indicating that the UE supports resource information forwarding. In some examples of the method, apparatuses, and non-transitory computer-readable medium described herein, the layer-2 identifier may be from a set of layer-2 identifiers available to UEs supporting resource information forwarding. In some examples of the method, apparatuses, and non-transitory computer-readable medium described herein, the layer-2 identifier may be a part of an upper-layer configuration at the UE or may be preconfigured at the UE based on the UE supporting resource information forwarding.

DETAILED DESCRIPTION

Figure 1:
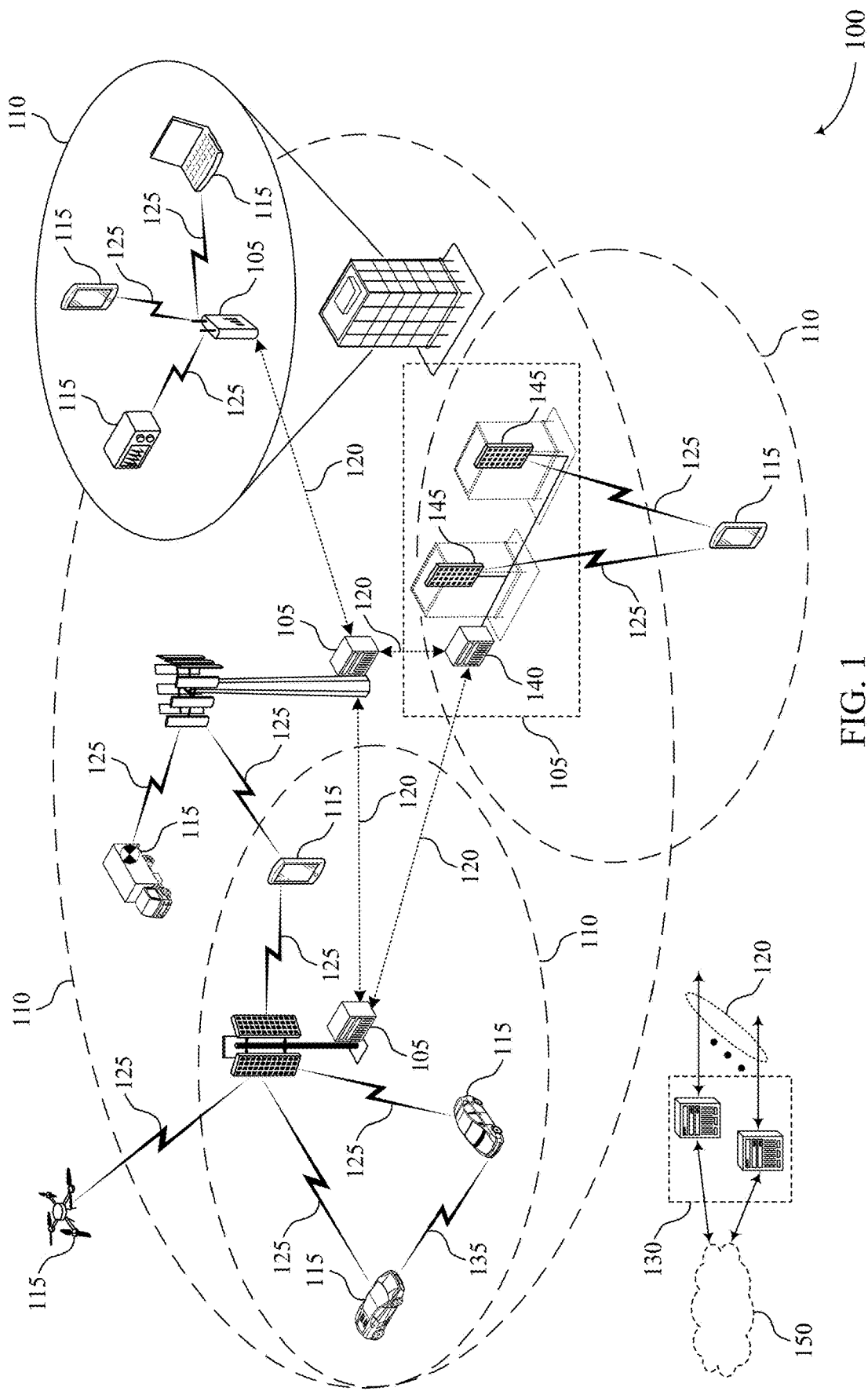
FIG. 1 illustrates an example of a wireless communications system that supports resource information forwarding for distributed sidelink in accordance with aspects of the present disclosure.

Some wireless communications systems may support sidelink communications between user equipment (UEs). In such systems, it may be appropriate for UEs to exchange messages to coordinate communications on sidelink resources (e.g., to avoid interference and collisions). Such messages may be referred to as inter-UE coordination messages. One example of an inter-UE coordination message is a resource information forwarding message. In an example, if a first UE receives sidelink control information (SCI) from a third UE indicating resources reserved by the third UE, the first UE may transmit a resource information forwarding message to a second UE indicating the resources reserved by the third UE. Although resource information forwarding messages may help to coordinate sidelink communications in a system, it may be challenging to balance the overhead of these messages with the usefulness of these messages.

As an example, if a quantity of UEs supporting resource information forwarding messages in a system is low (e.g., UEs capable of reading and interpreting resource information forwarding messages), it may be appropriate to include sufficient information in a resource information forwarding message since there may be a lower chance that a UE receives redundant resource information from multiple UEs in the system. In addition, it may be acceptable to include more resource information in the resource information forwarding message since the overhead of resource information forwarding messages in the system may be low (e.g., with only a few UEs transmitting these messages). Alternatively, if the quantity of UEs supporting resource information forwarding messages in a system is high, the overhead and redundancy associated with resource information forwarding in the system may be high.

As described herein, a wireless communications system may support efficient techniques for regulating a size of a resource information forwarding message to balance the overhead associated with transmitting the resource information forwarding message with the usefulness of the resource information forwarding message. A first UE may receive a sidelink control information (SCI) message from a third UE indicating resources reserved by the third UE, and it may be appropriate for the first UE to transmit a resource information forwarding message to a second UE indicating the resources reserved by the third UE (e.g., if the second UE is unable to receive the SCI from the third UE). As such, the first UE may determine a maximum size of the resource information forwarding message, and the first UE may generate and transmit the resource information forwarding message to the second UE in accordance with the determined maximum size.

Aspects of the disclosure are initially described in the context of wireless communications systems. Examples of processes and signaling exchanges that support resource information forwarding for distributed sidelink are then described. Aspects of the disclosure are further illustrated by and described with reference to apparatus diagrams, system diagrams, and flowcharts that relate to resource information forwarding for distributed sidelink.

FIG. 1 illustrates an example of a wireless communications system 100 that supports resource information forwarding for distributed sidelink in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105 (e.g., in a physical uplink control channel (PUCCH) or a physical uplink shared channel (PUSCH)), or downlink transmissions from a base station 105 to a UE 115 (e.g., in a physical downlink control channel (PDCCH) or a physical downlink shared channel (PDSCH)). Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). For instance, a base station 105 may be an example of an access network entity or another network entity. Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

As mentioned above, UEs 115 may communicate with each other over a D2D communication link 135. The D2D communication link 135 may be referred to as a sidelink. In some cases, sidelink communications may include communications over one or more sidelink channels. For instance, sidelink data transmissions may be over a physical sidelink shared channel (PSSCH), sidelink discovery expression transmissions may be over a physical sidelink discovery channel (PSDCH) (e.g., to allow proximal devices to discover each other's presence), sidelink control information transmissions may be over a physical sidelink control channel (PSCCH), sidelink feedback transmissions may be over a physical sidelink feedback channel (PSFCH), and sidelink broadcast transmissions may be over a physical sidelink broadcast channel (PSBCH). Sidelink communications may also include transmitting reference signals from one UE 115 to another UE 115.

Sidelink communications may take place in transmission or reception resource pools. A minimum resource allocation unit for sidelink communications may be a sub-channel in a frequency domain, and a resource allocation in a time domain for sidelink communications may be one slot. Some slots may not be available for sidelink, and some slots may contain feedback resources. In some aspects, an RRC configuration for sidelink communications may be preconfigured (e.g., preloaded on a UE 115) or signaled to a UE 115 (e.g., from a base station 105). In some examples, a base station 105 facilitates the scheduling of resources for sidelink communications (e.g., in a resource allocation mode 1). In other cases, sidelink communications are carried out between the UEs 115 without the involvement of a base station 105 (e.g., in a resource allocation mode 2).

Figure 2:
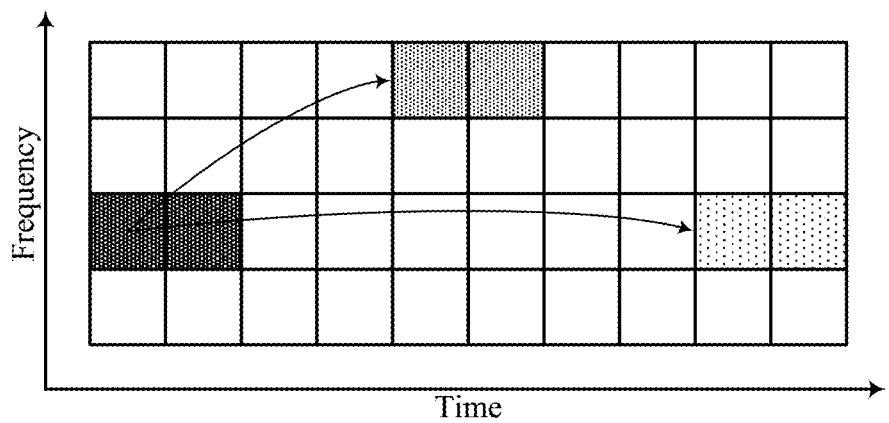
FIG. 2 illustrates an example of sidelink communications using mode-2 resource allocation in accordance with aspects of the present disclosure.

FIG. 2 illustrates an example of sidelink communications 200 using mode-2 resource selection in accordance with aspects of the present disclosure. In mode-2 resource selection, sidelink UEs 115 may autonomously reserve resources (e.g., without the involvement of a base station 105). That is, mode-2 may be supported without the presence of a central entity (e.g., such as a base station 105). After identifying resources to reserve for one or more sidelink transmissions, a UE 115 may transmit a first transmission of a data packet with an SCI 205 on sidelink resources. The SCI in 205 may indicate one or two future resources identified for subsequent retransmission (e.g., a first sidelink retransmission resource 210 and a second sidelink retransmission resource 215). In the example of FIG. 2, the UE 115 may then transmit a first retransmission of the data packet on the first sidelink retransmission resource 210 and a second retransmission of the data packet on the second sidelink retransmission resource 215.

A UE 115 may determine a set of candidate resources to use for sidelink communications and may continuously decode SCI from other UEs 115 (e.g., peers). The SCI from the other UEs 115 may include reservation information (e.g., resources such as slots or resource blocks that peers may use in the future), and the UE 115 may use the SCI to identify resources reserved by these other UEs 115. If the SCI from another UE 115 is received and decoded by the UE 115, and the UE 115 determines that the decoded SCI has a high reference signal received power (RSRP), the UE 115 may determine that the other UE 115 is possibly close to the UE 115 (e.g., resulting in higher interference). As such, the UE 115 may remove resources indicated in the decoded SCI from the set of candidate resources to use for sidelink communications. The UE 115 may then randomly select N resources from the set of candidate resources for transmitting or retransmitting a transport block. For every transmission, the UE 115 may reserve resources for up to two retransmissions in the future.

In some cases, there may be one or more causes for a loss in reliability associated with sidelink transmissions. For instance, a first transmission from a UE 115 may be unprotected. Specifically, because the UE 115 may not reserve resources for the first transmission, other UEs 115 may schedule transmissions that interfere with the first transmission from the UE 115 (e.g., the first transmission may collide with another transmission). In addition, the UE 115 may experience half-duplex loss if an intended receiver of the first transmission is scheduled to transmit another transmission and receive the first transmission at the same time (e.g., on the same resources). In some examples, a transmitting UE 115 may also experience link quality issues with a receiving UE 115 (e.g., due to a non-line-of-sight (NLOS) component of a link with the receiving UE 115, a large distance between the transmitting UE 115 and the receiving UE 115, etc.).

To improve the quality of sidelink communications in wireless communications system 100 (e.g., to avoid interference and collisions), it may be appropriate for UEs 115 supporting sidelink communications to exchange messages to coordinate communications on sidelink resources. Such messages may be referred to as inter-UE coordination messages. In one example, a first UE 115 may send an inter-UE coordination message to a second UE 115 indicating a set of resources preferred or not preferred (e.g., non-preferred) for a transmission from the second UE 115 (e.g., based on a sensing result). In another example, the first UE 115 may send to the second UE 115 an inter-UE coordination message indicating a set of resources where a resource conflict is detected.

To facilitate inter-UE coordination, it may be appropriate to determine how or when the first UE 115 determines the contents of the indicated set of resources (e.g., including consideration of uplink scheduling). Further, it may be appropriate to determine when the first UE 115 sends an indication of a set of resources to the second UE 115, which UEs 115 are to send indications of a set of resources, how the first UE 115 and the second UE 115 are determined, how the first UE 115 sends a set of resources to the second UE 115 (e.g., including a container for carrying the indication, implicitly, explicitly, or both), how, when, or whether the second UE 115 receives a set of resources and takes the set of resources into account in resource selection for a transmission from the second UE, and how or whether to define a relationship between support or signaling of inter-UE coordination and a cast type.

A UE 115 in wireless communications system 100 may support efficient techniques for utilizing inter-UE coordination messages.

In one example, a first UE 115 may use an inter-UE coordination message for conflict detection and indication. In this example, the first UE 115 may detect a conflict between a second UE 115 and a third UE 115, and the first UE 115 may transmit an inter-UE coordination message to the second UE 115 and the third UE 115 indicating the conflict. In some cases, the first UE 115 may transmit the indication of the conflict before the conflict event (e.g., pre-conflict) based on future reservation information (e.g., applicable for groupcast and unicast). In other cases, the first UE 115 may transmit the indication of the conflict after the conflict event (e.g., post-conflict) based on decoding the current transmissions in a conflict (e.g., for groupcast communications).

In another example, a first UE 115 may use an inter-UE coordination message for resource information forwarding. Such an inter-UE coordination message may be referred to as a resource information forwarding message. In this example, the first UE 115 may transmit an indication to a second UE 115 of one or a set of resources for the second UE 115 to use or avoid. For instance, the first UE 115 may forward reservation information sent by a third UE 115 to the second UE 115. Additionally, or alternatively, the first UE 115 may transmit resource information to the second UE 115 in a resource information forwarding message based on the reservation information sent by the third UE 115. Upon receiving the reservation information or resource information from the first UE 115, the second UE 115 may select an appropriate resource that does not create a conflict with the third UE 115.

Figure 3:
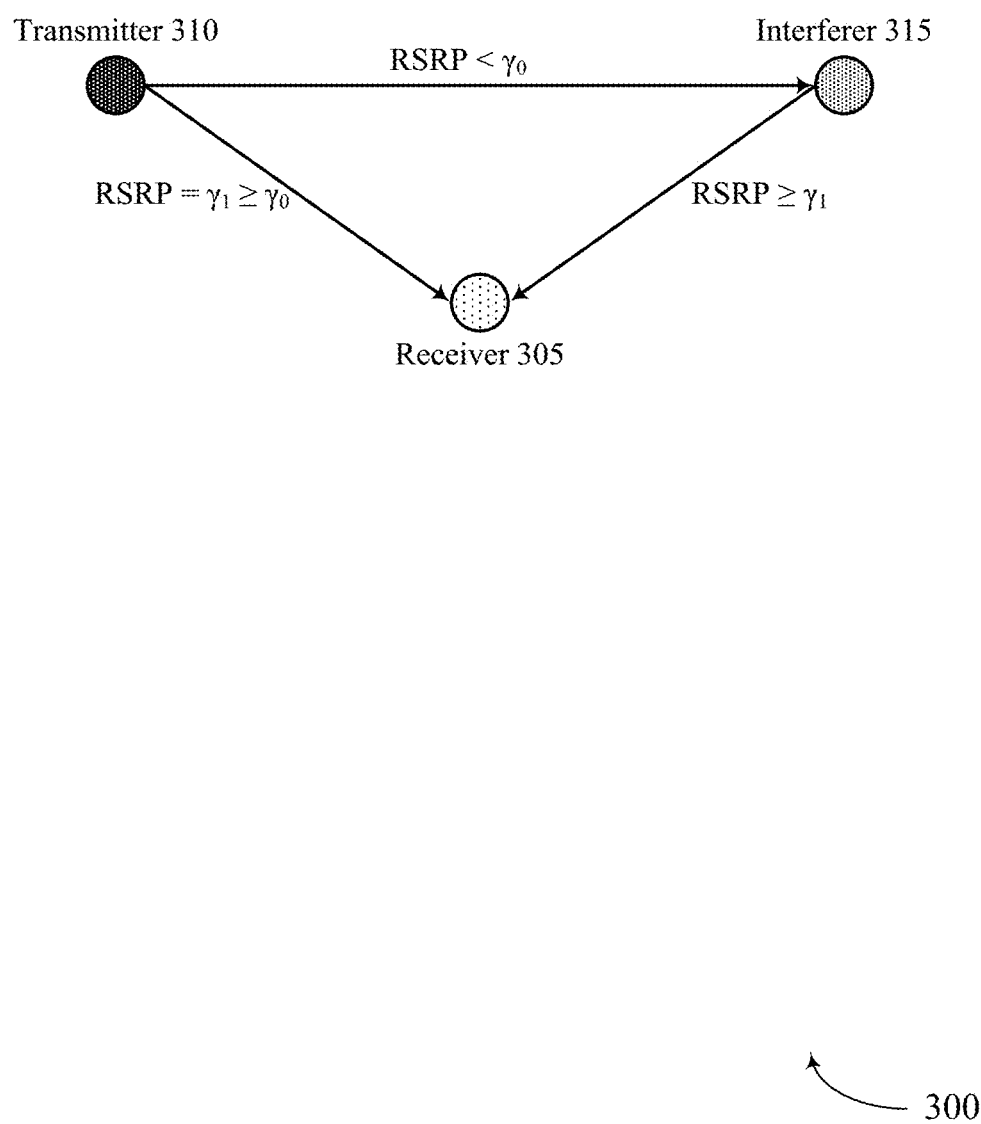
FIG. 3 illustrates an example of inter-user equipment (UE) coordination in accordance with aspects of the present disclosure.

FIG. 3 illustrates an example of inter-UE coordination 300 in accordance with aspects of the present disclosure. In one example, a receiver 305 may receive an indication from an interferer 315 of resources reserved by the interferer 315, and the receiver 305 may forward the resources reserved by the interferer 315 to the transmitter 310 in a resource information forwarding message. The interferer 315 may reserve the same resources as the transmitter 310 or overlapping resources with the transmitter 310 leading to interference at the receiver 305. In this example, the receiver 305 may transmit an indication of the conflict to the transmitter 310. Although resource information forwarding messages may help to coordinate sidelink communications in a system, it may be challenging to balance the overhead of transmitting resource information forwarding messages with the usefulness of the resource information forwarding messages.

As an example, if a quantity of UEs 115 supporting resource information forwarding messages in a system is low (e.g., UEs 115 capable of reading and interpreting resource information forwarding messages), it may be appropriate to include sufficient information in a resource information forwarding message since there may be a lower chance that a UE 115 receives redundant resource information from multiple UEs 115 in the system. In addition, it may be acceptable to include more resource information in the resource information forwarding message since the overhead of resource information forwarding messages in the system may be low (e.g., with only a few UEs 115 transmitting these messages). Alternatively, if the quantity of UEs 115 supporting resource information forwarding messages in a system is high, the overhead associated with resource information forwarding in the system may be high.

Figure 4:
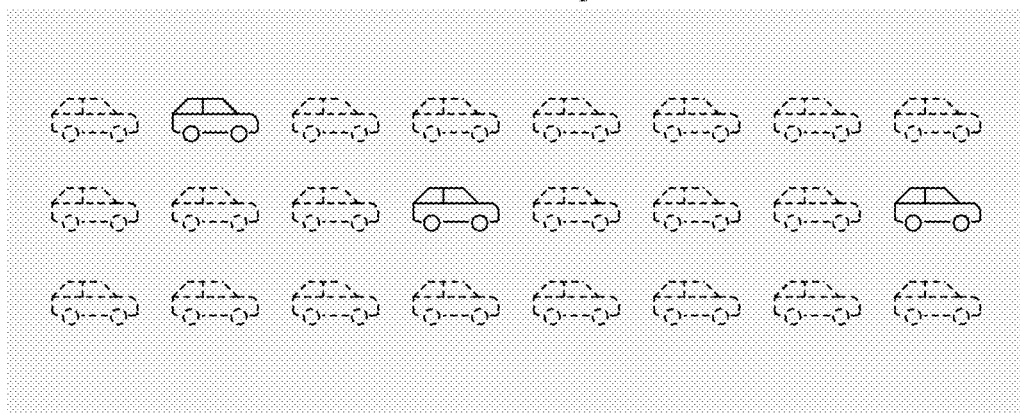
FIG. 4 illustrates examples of adoption rates of UEs in accordance with aspects of the present disclosure.
Figure 4:
Figure 4:
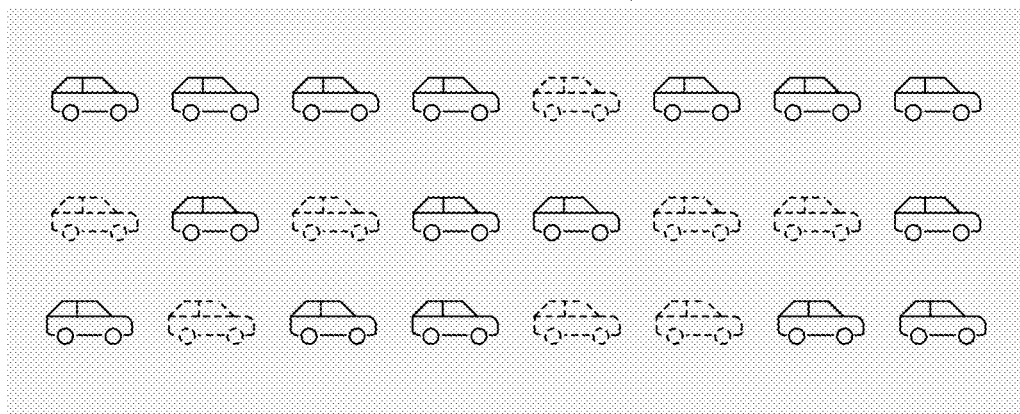
Figure 4:
Figure 4:

FIG. 4 illustrates examples of adoption rates 400 of UEs 115 in accordance with aspects of the present disclosure. In a first example 400-*a*, a wireless communications system may include a large percentage of a first release of UEs 115 (e.g., release-16 (R16) UEs 115) and a small percentage of a second release of UEs 115 (e.g., release-17 (R17) UEs 115). In a second example 400-*b*, the wireless communications system may include a small percentage of the first release of UEs 115 and a large percentage of the second release of UEs 115. The second release of UEs 115 may refer to UEs 115 supporting resource information forwarding or UEs 115 capable of utilizing (e.g., transmitting, receiving, or processing) resource information forwarding messages, and the first release of UEs 115 may refer to UEs 115 not supporting resource information forwarding or UEs 115 incapable of utilizing resource information forwarding messages.

The transition of UEs 115 in a system from the first release of UEs 115 to the second release of UEs 115 may be gradual. For instance, suppose that R16 is initially deployed, it may take some time for auto-manufacturers to transition to R17 UEs 115. The R17 UEs 115 may support advanced traffic, and the R17 UEs 115 may have higher quality of service (QoS) requirements. Thus, it may be appropriate to support reliability enhancements offered by R17. However, when the R17 adoption is low, the gains due to inter-UE coordination may be limited or absent. The minimal gains may occur since few UEs 115 may be present in a network to forward resource information (e.g., using resource information forwarding messages). Accordingly, it may be challenging for a system to provide reliability gains for traffic over R17 without hampering (or improving) R16 performance. That is, it may take some adaptability in an R17 inter-UE coordination mechanism to provide the reliability gains.

To facilitate inter-UE coordination considering an adoption rate of UEs 115, it may be appropriate for UEs 115 to balance the overhead of resource information forwarding messages with the usefulness of the resource information forwarding messages. For example, in some cases, there may be few R17 devices in a network (e.g., a low R17 adoption rate), and few UEs 115 may perform inter-UE coordination. In such cases, R17 UEs 115 may benefit from sending more information in a resource information forwarding message. Specifically, there may be a lower chance that another UE 115 is forwarding this information, and shared information may have lower redundancy. Further, fewer UEs 115 may use a dedicated set of resources to transmit resource information forwarding messages, so it may be possible to send a larger amount of information with a higher modulation and coding scheme (MCS) as reliability requirements may be relaxed. An R17 UE 115 may then send less information when the R17 UE 115 detects an increase in an adoption rate.

The utilization of resource information forwarding messages may also be affected by periodic reservations in a system (e.g., if there are many periodic reservations in the system). Because periodic reservations (e.g., semi-persistent scheduling (SPS)) may be valid for a longer span of time, for R17 UEs 115, it may be useful to prioritize forwarding periodic reservations. For instance, if another UE 115 has missed information associated with periodic reservations in the past, there may be a high chance of future collisions. As such, it may be appropriate for a UE 115 to forward periodic reservations.

Wireless communications system 100 may support efficient techniques for regulating a size of a resource information forwarding message (e.g., to balance the overhead associated with transmitting the resource information forwarding message with the usefulness of the resource information forwarding message).

R17 UEs 115 in wireless communications system 100 may be capable of sharing resource information forwarding messages to enhance reliability through inter-UE coordination. However, the R17 UEs 115 may limit the amount of resource information included in the resource information forwarding messages. In some cases, there may be a default or preconfigured limit to the size of a resource information forwarding message. Further, in some cases, it may be beneficial to forward more resource information, and, in other cases, it may be beneficial to have a stricter limitation on a size of a resource information forwarding message. In some aspects, R17 UEs 115 may determine the size limit of resource information forwarding messages autonomously based on several criteria. The criteria may be based on congestion, a presence of UEs 115 using older releases of NR sidelink (e.g., R16 UEs 115), etc. Further, the R17 UEs 115 may perform MCS adaptation, change resource allocation, or both for transmitting a variable size resource information forwarding message.

Figure 5:
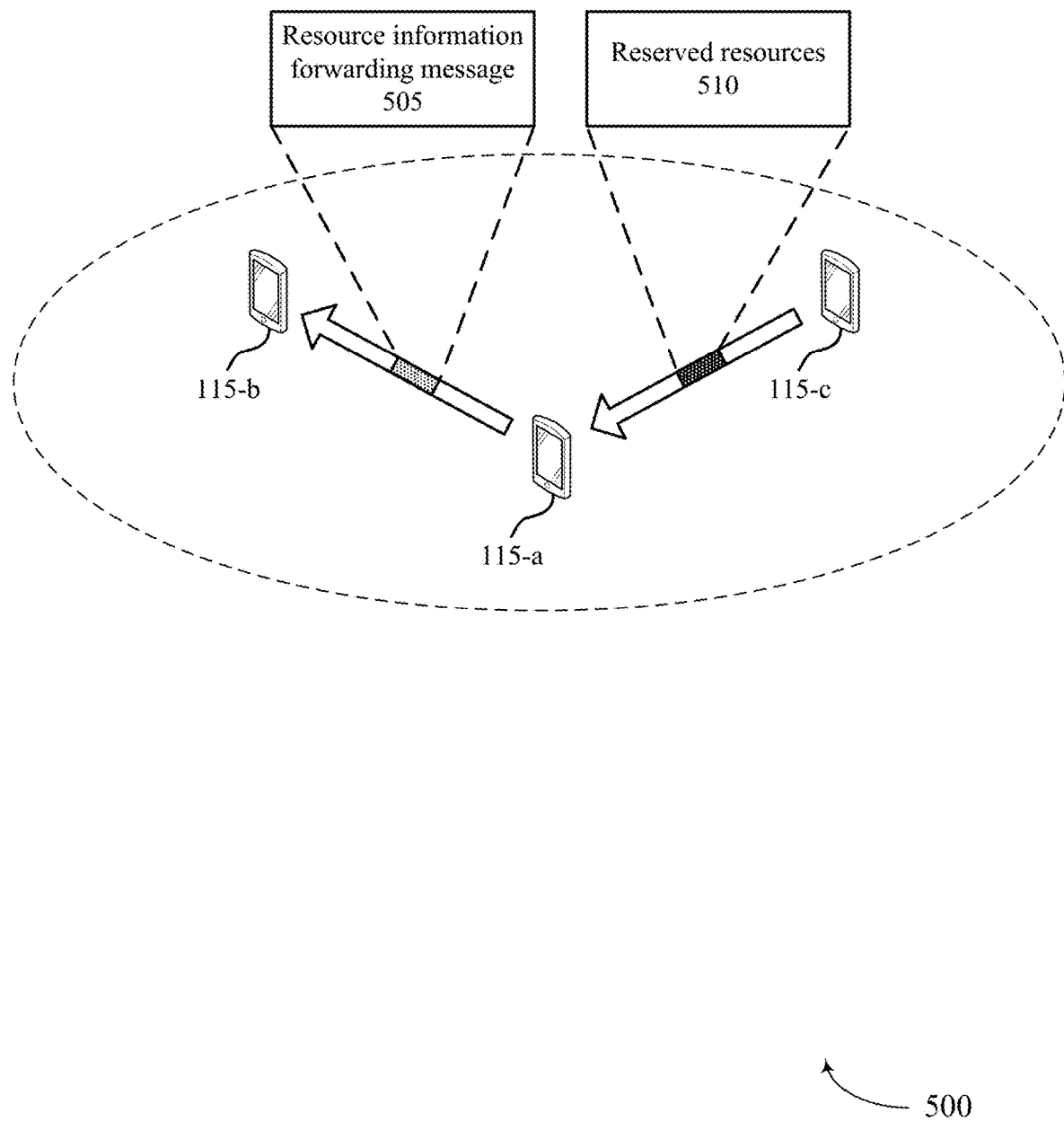
FIG. 5 illustrates an example of a wireless communications system that supports resource information forwarding for distributed sidelink in accordance with aspects of the present disclosure.

FIG. 5 illustrates an example of a wireless communications system 500 that supports resource information forwarding for distributed sidelink in accordance with aspects of the present disclosure. The wireless communications system 500 includes a UE 115-$a$, a UE 115-$b$, and a UE 115-$c$, which may be examples of UEs 115 described with reference to FIGS. 1-4. The wireless communications system 500 may implement aspects of the wireless communications system 100. For example, the wireless communications system 500 may support efficient techniques for regulating a size of a resource information forwarding message (e.g., to balance the overhead associated with transmitting the resource information forwarding message with the usefulness of the resource information forwarding message). Although the examples described are related to utilizing a resource information forwarding message, it is to be understood that similar techniques may be supported for other inter-UE coordination messages (e.g., a maximum size of an inter-UE coordination message).

The UE 115-$a$ may receive an indication 510 from the UE 115-$c$ of resources reserved by the UE 115-$c$, and it may be appropriate for the UE 115-$a$ to transmit a resource information forwarding message 505 to the UE 115-$b$ indicating the resources reserved by the UE 115-$c$. The UE 115-$a$ may determine a maximum size of the resource information forwarding message 505, and the UE 115-$a$ may generate and transmit the resource information forwarding message 505 to the UE 115-$b$ in accordance with the determined maximum size. The maximum size of the resource information forwarding message 505 may correspond to a quantity of resources (e.g., reserved by one or more UEs 115) indicated in the resource information forwarding message 505. The maximum size of the resource information forwarding message may be represented as $N_{Rscinfo}^{max}$. In some aspects, the maximum size, $N_{Rscinfo}^{max}$ of the resource information forwarding message 505 may be defined at the UE 115-$a$ (e.g., indicated in a pre-configuration). In other aspects, the UE 115-$a$ may determine the maximum size, $N_{Rscinfo}^{max}$, of the resource information forwarding message 505 based on one or more factors.

In some cases, the UE 115-$a$ may determine the maximum size of the resource information forwarding message 505 based on a number of periodic reservations received during sensing. The periodic reservations may refer to SPS reservations which indicate resource reservations in the future with an indicated periodicity. In some cases, the UE 115-$a$ may determine the maximum size of the resource information forwarding message 505 based on an estimated R16-R17 split. The R16-R17 split may refer to a penetration rate or adoption rate of a newer release of NR sidelink UEs. In some examples, the R16-R17 split may refer to a ratio of quantities of R16 and R17 UEs 115 detected during sensing, and, in other examples, the R16-R17 split may refer to a ratio of quantities of SCI messages received from R16 and R17 UEs 115 during sensing. In some cases, the UE 115-$a$ may determine the maximum size of the resource information forwarding message 505 based on a congestion metric (e.g., a channel busy ratio (CBR)). In some cases, the UE 115-$a$ may determine the maximum size of the resource information forwarding message 505 based on a size of a container or message (e.g., a transport block) carrying the resource information forwarding message 505 (e.g., such that the size of the resource information forwarding message 505 does not exceed the size of the container or message).

In one aspect, the CBR or the congestion metric may be for the entire system, and the UE 115-$a$ may monitor all sidelink resources to determine the CBR or congestion metric. In another aspect, if dedicated resources or a dedicated channel is assigned for resource information messages, the CBR or congestion metric may be based on measurements over dedicated resources or a dedicated channel (e.g., only). As an example, the UE 115-$a$ may determine the CBR or congestion metric based on performing sensing on all sidelink resources in a sensing window or a subset of the sidelink resources in the sensing window dedicated for resource information forwarding measurements. The UE 115-$a$ (e.g., an R17 UE 115) may use one or more of the above conditions to determine the size of the resource information forwarding message 505 (or resource information sharing message). For instance, there may be an initial pre-configured maximum size, and the UE 115-$a$ may adapt the pre-configured maximum size based on detection of R16 devices and SPS reservations.

As mentioned, it may be appropriate for the UE 115-$a$ to determine the presence of UEs 115 from older releases (e.g., R16) in the wireless communications system 500 (e.g., to determine the maximum size of the resource information forwarding message 505). The presence of UEs 115 associated with older releases of NR may trigger greater or lesser information sharing. In some cases, it may be appropriate for an R17 UE 115 to determine the number of nodes in the wireless communications system 500 using older releases (e.g., R16). For example, it may be appropriate for an R17 UE 115 supporting resource information forwarding messages to determine if and how many R16 UEs 115 are present in a network. Based on the quantity of R16 UEs 115 present, the R17 UE 115 may determine a size of the resource information forwarding message 505.

To allow the UE 115-*a* to determine the R16-R17 split, R17 UEs in wireless communications system 500 may support signaling of the use of a new release (e.g., R17). In one case, a UE 115 using a newer release (e.g., R17) may indicate that the UE 115 is using the newer release using control information. For instance, an R17 UE 115 may indicate that the UE 115 is an R17 UE 115 using a MAC-CE or using a reserved bit in SCI (e.g., in a second stage of the SCI (SCI-2)). In another case, an R17 UE 115 may use a layer-2 identifier distinct from a layer-2 identifier of an R16 UE 115. For instance, the R17 UE 115 may select a layer-2 identifier from a set of layer-2 identifiers, and the set of layer-2 identifiers may be distinct from a set of layer-2 identifiers used by R16 UEs 115. The layer-2 identifier used by the R17 UE 115 may also be a part of an upper layer configuration, a pre-configuration, or both.

Once the UE 115-*a* determines the maximum size of the resource information forwarding message 505, the UE 115-*a* may determine the contents of the resource information forwarding message 505. In some cases, the UE 115-*a* may sort resource information available to be sent to the UE 115-*b*, and the UE 115-*a* may send at least a first portion of the sorted resource information in the resource information forwarding message 505 to the UE 115-*b*. For instance, the resource information may include multiple sets of resources reserved by the UE 115-*c* and other UEs 115, and the UE 115 may sort the sets of resources reserved by the UE 115-*c* and the other UEs 115. The UE 115-*a* may then send, to the UE 115-*b*, a first one or more sets of resources of the sorted sets of resources reserved by the UE 115-*c* and the other UEs 115. The first one or more sets of resources may refer to the sets of resources with the lowest indices in the sorted sets of resources (e.g., if each set of resources is assigned an index during sorting).

In one aspect, the UE 115-*a* may sort each reservation or set of resources (e.g., reservation information) based on a slot or time of the reservation (e.g., at which the reservation is intended), and the UE 115-*a* may transmit the N earliest reservations in the resource information forwarding message 505 after sorting. In another aspect, the UE 115-*a* may sort each reservation or set of resources (e.g., stored reservation information) by the received signal power or signal quality (e.g., of the SCI making the reservation or reserving the set of resources), and the UE 115-*a* may choose the N reservations associated with the highest signal power or quality (e.g., of the SCI making the reservations) to transmit in the resource information forwarding message 505. In yet another aspect, the UE 115-*a* may sort each reservation or set of resources (e.g., stored reservation information) by the distance from the UE 115-*a* to the reserving or forwarding UE 115 (e.g., the UE 115 making the reservation or reserving the set of resources), and the UE 115-*a* may choose the N reservations received from the closest UEs 115 to transmit in the resource information forwarding message 505. The UE 115-*a* may perform the sorting and selection of reservations or sets of resources to indicate in the resource information forwarding message 505 based on one or more of the above criteria.

Once the UE 115-*a* determines the maximum size of the resource information forwarding message 505 and the contents of the resource information forwarding message 505, the UE 115-*a* may transmit the resource information forwarding message 505 to the UE 115-*b*. In some examples, the UE 115-*b* may request the resource information forwarding message 505 from the UE 115-*a*, and the UE 115-*a* may transmit the resource information forwarding message 505 to the UE 115-*b* in response to the request. In other examples, the UE 115-*a* may autonomously transmit the resource information forwarding message 505 to the UE 115-*b* (e.g., without a request from the UE 115-*b*).

In some cases, the UE 115-*a* may adapt an MCS for the resource information forwarding message 505 based on the determined size of the resource information forwarding message 505. By adapting the MCS for the resource information forwarding message 505, the UE 115-*a* may use a fixed or minimum number of resources to transmit the resource information forwarding message 505, which may be useful when the available amount of resources for forwarding (e.g., for the resource information forwarding message 505) is fixed. In some cases, the UE 115-*a* may transmit the resource information forwarding message 505 using a fixed MCS and using additional transmission resources (e.g., if appropriate). The fixed MCS may be a part of a pre-configuration and may be associated with a fixed reliability of the resource information forwarding message 505. In some cases, the UE 115-*a* may transmit the resource information forwarding message 505 in accordance with a fixed, maximum MCS. In such cases, the UE 115-*a* may determine the number of resources (e.g., physical resource blocks) to use to transmit the resource information forwarding message 505 with the given limit on the MCS based on the maximum size of the resource information forwarding message 505. By supporting the fixed, maximum MCS, the UE 115-*a* may support a minimum reliability for the resource information forwarding message 505.

Figure 6:
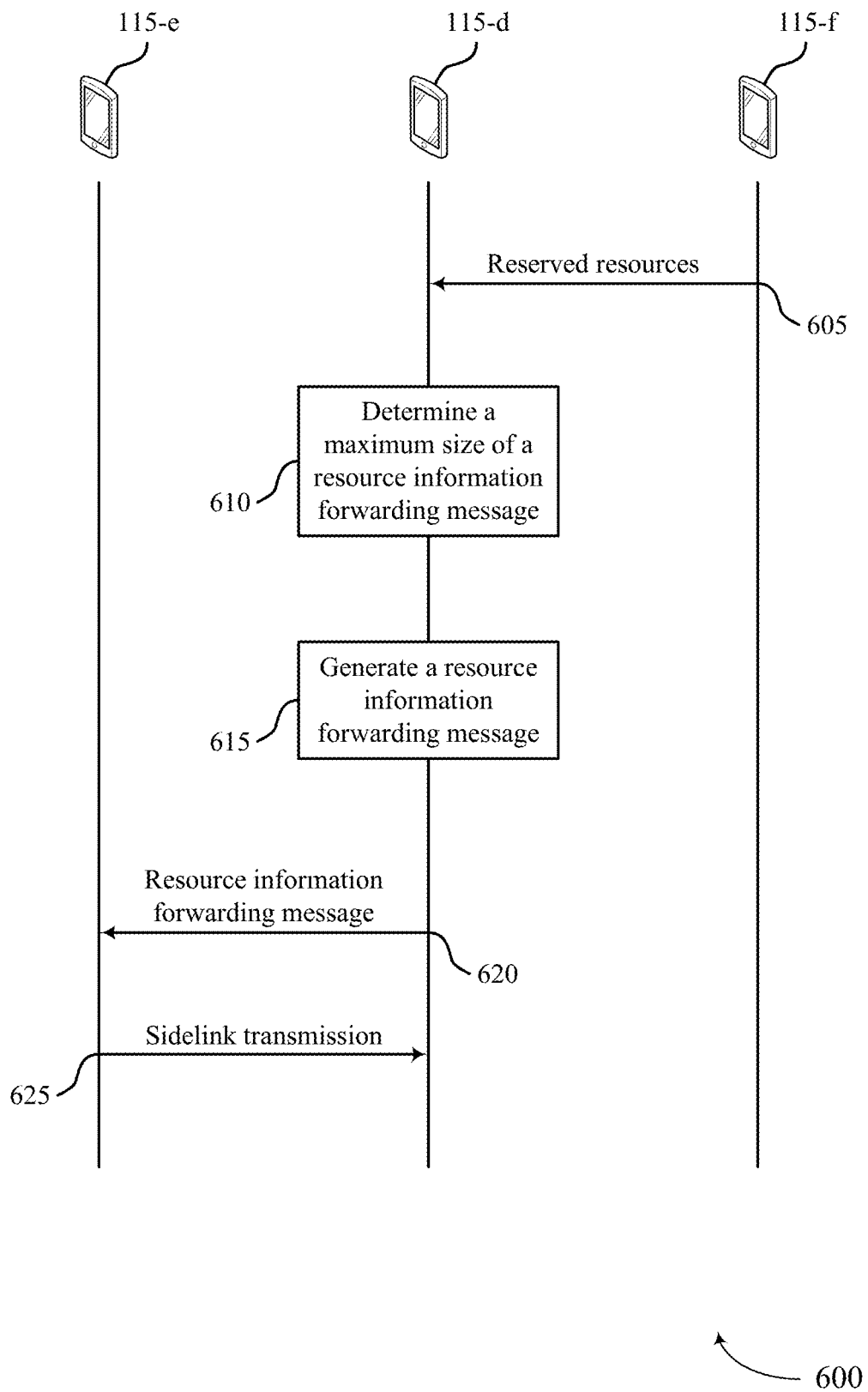
FIG. 6 illustrates an example of a process flow that supports resource information forwarding for distributed sidelink in accordance with aspects of the present disclosure.

FIG. 6 illustrates an example of a process flow 600 that supports resource information forwarding for distributed sidelink in accordance with aspects of the present disclosure. Process flow 600 includes UE 115-*d*, UE 115-*e*, and UE 1154, which may be examples of UEs 115 described with reference to FIGS. 1-5. The process flow 600 may implement aspects of the wireless communications system 100 or the wireless communications system 500. For example, the process flow 600 may support efficient techniques for regulating a size of a resource information forwarding message (e.g., to balance the overhead associated with transmitting the resource information forwarding message with the usefulness of the resource information forwarding message).

In the following description of the process flow 600, the signaling exchanged between the UE 115-*d*, the UE 115-*e*, and the UE 115-*f* may be exchanged in a different order than the example order shown, or the operations performed by the UE 115-*d*, the UE 115-*e*, or the UE 115-*f* may be performed in different orders or at different times. Some operations may also be omitted from the process flow 600, and other operations may be added to the process flow 600.

At 605, the UE 115-*d* may receive, from the UE 115-*f*, an SCI message indicating a set of sidelink resources reserved by the UE 115-*f*. At 610, the UE 115-*d* may determine a maximum size of a resource information forwarding message to be transmitted to the UE 115-*e* over a sidelink channel. The resource information forwarding message may indicate at least the set of sidelink resources reserved by the UE 115-*f*.

In some cases, the maximum size of the resource information forwarding message may be preconfigured at the UE 115-*d* (e.g., with or without signaling from another device).

In some cases, the UE 115-*d* may determine the maximum size of the resource information forwarding message based on a quantity of periodic reservations made by one or more UEs 115 in a sensing window, a ratio of UEs 115 supporting resource information forwarding and other UEs 115 not supporting resource information forwarding detected in the sensing window, or a congestion matric calculated based on the sensing window. The UE 115-*d* may adapt a preconfigured maximum size of the resource information forwarding message to another maximum size of the resource information forwarding message based on the quantity of periodic reservations, the ratio of UEs 115 supporting resource information forwarding and other UEs 115 not supporting resource information forwarding, or the congestion metric.

In some cases, the UE 115-*d* may perform sensing during the sensing window, and the UE 115-*d* may determine the quantity of periodic reservations made by the one or more UEs 115, the ratio of UEs 115 supporting resource information forwarding and other UEs 115 not supporting resource information forwarding, or the congestion metric based on performing the sensing during the sensing window. Additionally, or alternatively, the UE 115-*d* may determine the quantity of periodic reservations made by the one or more UEs 115, the ratio of UEs 115 supporting resource information forwarding and other UEs 115 not supporting resource information forwarding, or the congestion metric based on historical information on device capabilities or traffic pattern information. In some cases, the UE 115-*d* may calculate the congestion metric based on measurements performed on sidelink resources in the sensing window or measurements performed on a subset of the sidelink resources in the sensing window dedicated for resource information forwarding measurements.

In some cases, the UE 115-*d* may receive control information (e.g., SCI or a MAC-CE) from the UEs 115 supporting resource information forwarding indicating that the UEs 115 support resource information forwarding, and the UE 115-*d* may determine the ratio of the UEs 115 supporting resource information forwarding and other UEs 115 not supporting resource information forwarding based on receiving the control information. In some cases, the UE 115-*d* may receive a packet from each UE 115 supporting resource information forwarding, where the packet includes a layer-2 identifier indicating that the UE 115 supports resource information forwarding. The layer-2 identifier may be from a set of layer-2 identifiers available to UEs 115 supporting resource information forwarding, or the layer-2 identifier may be a part of an upper-layer configuration or may be preconfigured at UEs 115 supporting resource information forwarding.

At 615, the UE 115-*d* may generate the resource information forwarding message in accordance with the determine maximum size of the resource information forwarding message. In some cases, the UE 115-*d* may receive one or more SCI messages (e.g., including the SCI received at 605) indicating one or more sets of sidelink resources reserved by one or more UEs 115, where the one or more sets of sidelink resources includes the sidelink resources reserved by the UE 115-*f* In such cases, the UE 115-*d* may sort the one or more sets of sidelink resources reserved by the one or more UEs 115, and the UE 115-*d* may generate the resource information forwarding message to indicate at least a first one or more sets of sidelink resources of the sorted sets of sidelink resources. The UE 115-*d* may sort the one or more sets of sidelink resources reserved by the one or more UEs 115 based on a time at which each set of sidelink resources is reserved, a signal strength or quality metric of each SCI message reserving a corresponding set of sidelink resources, or a distance between the UE 115-*d* and a UE 115 of the one or more UEs 115 reserving each set of sidelink resources.

At 620, the UE 115-*d* may transmit the generated resource information forwarding message to the UE 115-*e* over the sidelink channel. In some cases, the UE 115-*d* may identify resources allocated or pre-allocated for transmitting the resource information forwarding message to the UE 115-*e*, and the UE 115-*d* may adapt an MCS for generating the resource information forwarding message based on the resources allocated or pre-allocated for transmitting the resource information forwarding message to the UE 115-*e*. In some cases, the UE 115-*d* may generate the resource information forwarding message using a fixed MCS, and the UE 115-*d* may adapt a quantity of resources for transmitting the resource information forwarding message to the UE 115-*e* based on generating the resource information forwarding message using the fixed MCS. In some cases, the UE 115-*d* may generate the resource information forwarding message based on a fixed, maximum MCS, and the UE 115-*d* may adapt a quantity of resources for transmitting the resource information forwarding message to the UE 115-*e* based on generating the resource information forwarding message based on the fixed, maximum MCS.

In some cases, the UE 115-*d* may receive a request from the UE 115-*e* for the resource information forwarding message, and the UE 115-*d* may transmit the resource information forwarding message to the UE 115-*e* based on receiving the request. In some cases, the UE 115-*d* may autonomously transmit the resource information forwarding message to the UE 115-*e* (e.g., without receiving a request from the UE 115-*e*). At 625, the UE 115-*e* may transmit a sidelink transmission to the UE 115-*d* or another UE 115 based on the resource information forwarding message received from the UE 115-*d* (e.g., avoiding the resources reserved by the UE 115-*f*). That is, the UE 115-*e* may communicate with the UE 115-*d* or another UE 115 based on the resource information forwarding message received from the UE 115-*d*.

Figure 7:
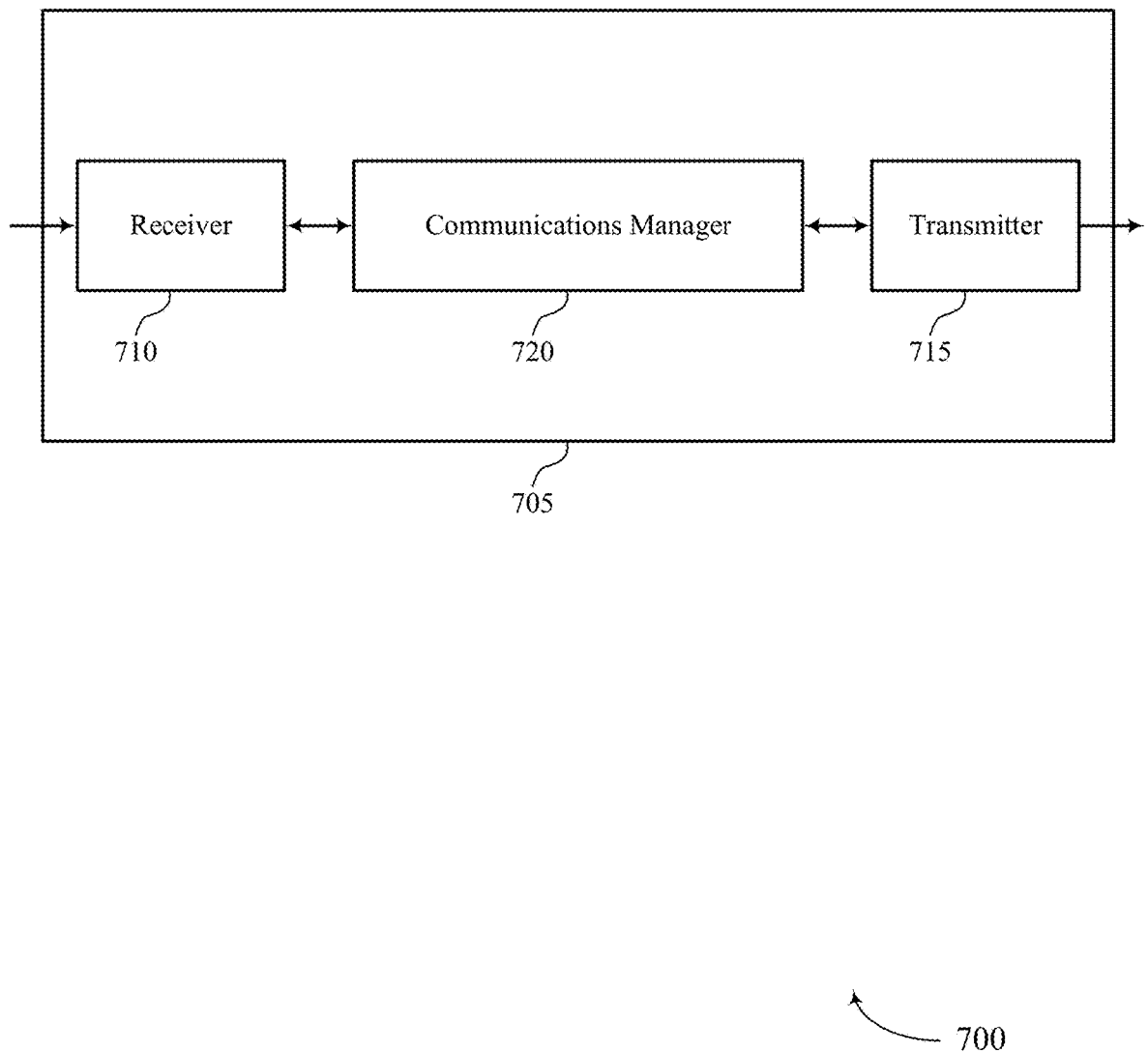
FIGS. 7 and 8 show block diagrams of devices that support resource information forwarding for distributed sidelink in accordance with aspects of the present disclosure.

FIG. 7 shows a block diagram 700 of a device 705 that supports resource information forwarding for distributed sidelink in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to resource information forwarding for distributed sidelink). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to resource information forwarding for distributed sidelink). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of resource information forwarding for distributed sidelink as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first UE in accordance with examples as disclosed herein. For example, the communications manager 720 may be configured as or otherwise support a means for determining a maximum size of a resource information forwarding message to be transmitted to a second UE over a sidelink channel, the resource information forwarding message indicating at least a set of sidelink resources reserved by a third UE. The communications manager 720 may be configured as or otherwise support a means for generating the resource information forwarding message in accordance with the determined maximum size. The communications manager 720 may be configured as or otherwise support a means for transmitting the generated resource information forwarding message to the second UE over the sidelink channel.

Additionally, or alternatively, the communications manager 720 may support wireless communication at a UE in accordance with examples as disclosed herein. For example, the communications manager 720 may be configured as or otherwise support a means for generating, for transmission on sidelink resources, a packet including an indication that the UE supports resource information forwarding. The communications manager 720 may be configured as or otherwise support a means for transmitting the generated packet with the indication that the UE supports resource information forwarding.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced processing, reduced power consumption, and more efficient utilization of communication resources. Because a maximum size of resource information forwarding messages may be regulated, UEs may waste less resources exchanging resource information forwarding messages when these messages are less useful in coordinating sidelink communications. Further, because the overhead and usefulness of resource information forwarding messages may be balanced, the UEs may waste less processing time and processing power on processing resource information forwarding messages when these messages are less useful in coordinating sidelink communications.

Figure 8:
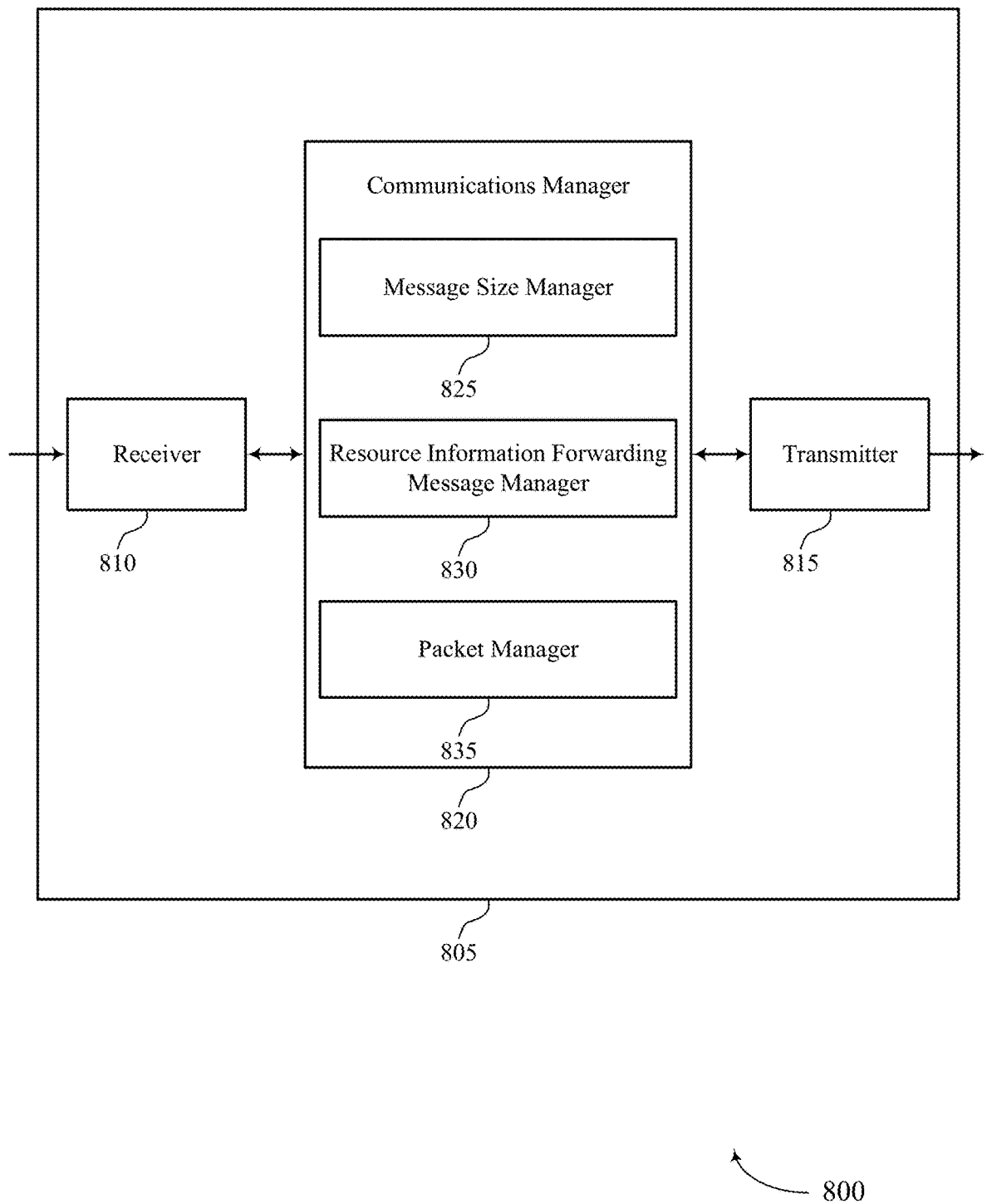

FIG. 8 shows a block diagram 800 of a device 805 that supports resource information forwarding for distributed sidelink in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to resource information forwarding for distributed sidelink). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to resource information forwarding for distributed sidelink). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of resource information forwarding for distributed sidelink as described herein. For example, the communications manager 820 may include a message size manager 825, a resource information forwarding message manager 830, a packet manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a first UE in accordance with examples as disclosed herein. The message size manager 825 may be configured as or otherwise support a means for determining a maximum size of a resource information forwarding message to be transmitted to a second UE over a sidelink channel, the resource information forwarding message indicating at least a set of sidelink resources reserved by a third UE. The resource information forwarding message manager 830 may be configured as or otherwise support a means for generating the resource information forwarding message in accordance with the determined maximum size. The resource information forwarding message manager 830 may be configured as or otherwise support a means for transmitting the generated resource information forwarding message to the second UE over the sidelink channel.

Additionally, or alternatively, the communications manager 820 may support wireless communication at a UE in accordance with examples as disclosed herein. The packet manager 835 may be configured as or otherwise support a means for generating, for transmission on sidelink resources, a packet including an indication that the UE supports resource information forwarding. The packet manager 835 may be configured as or otherwise support a means for transmitting the generated packet with the indication that the UE supports resource information forwarding.

Figure 9:
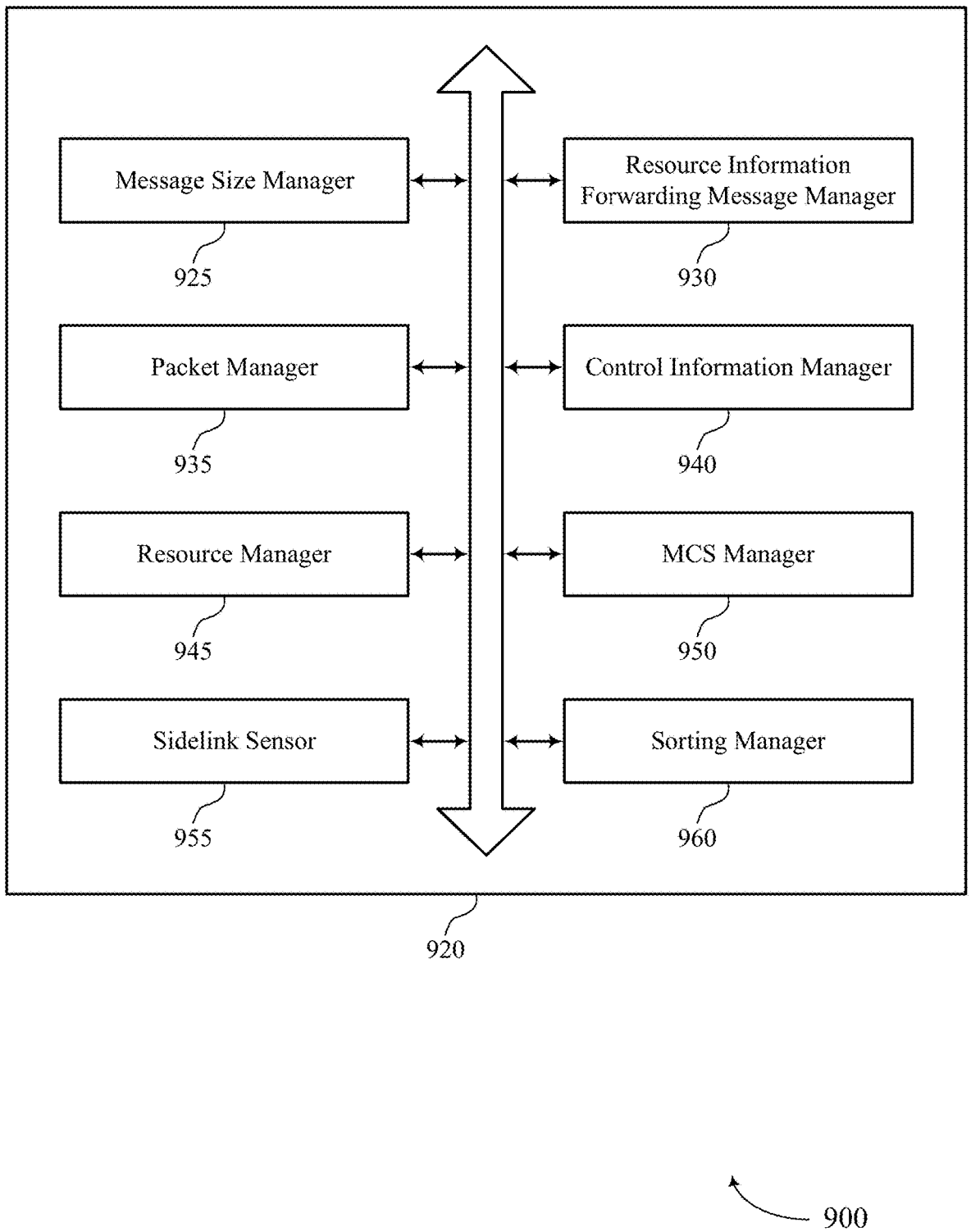
FIG. 9 shows a block diagram of a communications manager that supports resource information forwarding for distributed sidelink in accordance with aspects of the present disclosure.

FIG. 9 shows a block diagram 900 of a communications manager 920 that supports resource information forwarding for distributed sidelink in accordance with aspects of the present disclosure. The communications manager 920 may be an example of aspects of a communications manager 720, a communications manager 820, or both, as described herein. The communications manager 920, or various components thereof, may be an example of means for performing various aspects of resource information forwarding for distributed sidelink as described herein. For example, the communications manager 920 may include a message size manager 925, a resource information forwarding message manager 930, a packet manager 935, a control information manager 940, a resource manager 945, an MCS manager 950, a sidelink sensor 955, a sorting manager 960, or any combination thereof. Each of these components may communicate, directly or indirectly, with one another (e.g., via one or more buses).

The communications manager 920 may support wireless communication at a first UE in accordance with examples as disclosed herein. The message size manager 925 may be configured as or otherwise support a means for determining a maximum size of a resource information forwarding message to be transmitted to a second UE over a sidelink channel, the resource information forwarding message indicating at least a set of sidelink resources reserved by a third UE. The resource information forwarding message manager 930 may be configured as or otherwise support a means for generating the resource information forwarding message in accordance with the determined maximum size. In some examples, the resource information forwarding message manager 930 may be configured as or otherwise support a means for transmitting the generated resource information forwarding message to the second UE over the sidelink channel.

In some examples, the control information manager 940 may be configured as or otherwise support a means for receiving, from the third UE, a sidelink control information message indicating the set of sidelink resources reserved by the third UE, where transmitting the resource information forwarding message to the second UE includes forwarding the set of sidelink resources reserved by the third UE to the second UE.

In some examples, to support determining the maximum size of the resource information forwarding message, the message size manager 925 may be configured as or otherwise support a means for determining the maximum size of the resource information forwarding message based on a quantity of periodic reservations made by one or more UEs in a sensing window, a ratio of UEs supporting resource information forwarding and other UEs not supporting resource information forwarding detected in the sensing window, a congestion metric calculated based on the sensing window, or a combination thereof.

In some examples, to support determining the maximum size of the resource information forwarding message, the message size manager 925 may be configured as or otherwise support a means for adapting a preconfigured maximum size of the resource information forwarding message to determine the maximum size of the resource information forwarding message based on the quantity of periodic reservations, the ratio of UEs supporting resource information forwarding and other UEs not supporting resource information forwarding, the congestion metric, or a combination thereof.

In some examples, the sidelink sensor 955 may be configured as or otherwise support a means for performing sensing during the sensing window. In some examples, the message size manager 925 may be configured as or otherwise support a means for determining the quantity of periodic reservations made by the one or more UEs, the ratio of UEs supporting resource information forwarding and other UEs not supporting resource information forwarding, or the congestion metric based on performing the sensing during the sensing window, historical information on device capabilities, traffic pattern information, or a combination thereof.

In some examples, the message size manager 925 may be configured as or otherwise support a means for calculating the congestion metric based on measurements performed on sidelink resources in the sensing window or measurements performed on a subset of the sidelink resources in the sensing window dedicated for resource information forwarding measurements.

In some examples, the control information manager 940 may be configured as or otherwise support a means for receiving control information from the UEs supporting resource information forwarding indicating that the UEs support resource information forwarding. In some examples, the message size manager 925 may be configured as or otherwise support a means for determining the ratio of the UEs supporting resource information forwarding and other UEs not supporting resource information forwarding based on receiving the control information.

In some examples, the control information includes sidelink control information or a medium access control (MAC) control element (CE).

In some examples, the packet manager 935 may be configured as or otherwise support a means for receiving a packet from each UE supporting resource information forwarding, the packet including a layer-2 identifier indicating that the UE supports resource information forwarding.

In some examples, the layer-2 identifier is from a set of layer-2 identifiers available to UEs supporting resource information forwarding.

In some examples, the layer-2 identifier is a part of an upper-layer configuration or is preconfigured at UEs supporting resource information forwarding.

In some examples, the maximum size of the resource information forwarding message is preconfigured at the first UE.

In some examples, the control information manager 940 may be configured as or otherwise support a means for receiving one or more sidelink control information messages indicating one or more sets of sidelink resources reserved by one or more UEs, the one or more sets of sidelink resources including the set of sidelink resources reserved by the third UE.

In some examples, to support generating the resource information forwarding message, the sorting manager 960 may be configured as or otherwise support a means for sorting the one or more sets of sidelink resources reserved by the one or more UEs. In some examples, to support generating the resource information forwarding message, the resource information forwarding message manager 930 may be configured as or otherwise support a means for generating the resource information forwarding message to indicate at least a first one or more sets of sidelink resources of the sorted sets of sidelink resources.

In some examples, to support sorting the one or more sets of sidelink resources, the sorting manager 960 may be configured as or otherwise support a means for sorting the one or more sets of sidelink resources reserved by the one or more UEs based on a time at which each set of sidelink resources is reserved, a signal strength or quality metric of each sidelink control information message reserving a corresponding set of sidelink resources, a distance between the first UE and a UE of the one or more UEs reserving each set of sidelink resources, or a combination thereof.

In some examples, identifying resources allocated for transmitting the resource information forwarding message to the second UE. In some examples, adapting a modulation and coding scheme for generating the resource information forwarding message based on the resources allocated or pre-allocated for transmitting the resource information forwarding message to the second UE.

In some examples, generating the resource information forwarding message using a fixed modulation and coding scheme, the method further including. In some examples, adapting a quantity of resources for transmitting the resource information forwarding message to the second UE based on generating the resource information forwarding message using the fixed modulation and coding scheme.

In some examples, generating the resource information forwarding message based on a fixed, maximum modulation and coding scheme, the method further including. In some examples, adapting a quantity of resources for transmitting the resource information forwarding message to the second UE based on generating the resource information forwarding message based on the fixed, maximum modulation and coding scheme.

In some examples, the resource information forwarding message manager 930 may be configured as or otherwise support a means for receiving a request from the second UE for the resource information forwarding message, where transmitting the resource information forwarding message to the second UE is based on receiving the request.

In some examples, to support transmitting the resource information forwarding message to the second UE, the resource information forwarding message manager 930 may be configured as or otherwise support a means for autonomously transmitting the resource information forwarding message to the second UE.

Additionally, or alternatively, the communications manager 920 may support wireless communication at a UE in accordance with examples as disclosed herein. The packet manager 935 may be configured as or otherwise support a means for generating, for transmission on sidelink resources, a packet including an indication that the UE supports resource information forwarding. In some examples, the packet manager 935 may be configured as or otherwise support a means for transmitting the generated packet with the indication that the UE supports resource information forwarding.

In some examples, to support transmitting the packet with the indication that the UE supports resource information forwarding, the control information manager 940 may be configured as or otherwise support a means for transmitting control information in the packet indicating that the UE supports resource information forwarding.

In some examples, the control information includes sidelink control information or a medium access control (MAC) control element (CE).

In some examples, to support transmitting the packet with the indication that the UE supports resource information forwarding, the packet manager 935 may be configured as or otherwise support a means for transmitting a layer-2 identifier in the packet indicating that the UE supports resource information forwarding.

In some examples, the layer-2 identifier is from a set of layer-2 identifiers available to UEs supporting resource information forwarding.

In some examples, the layer-2 identifier is a part of an upper-layer configuration at the UE or is preconfigured at the UE based on the UE supporting resource information forwarding.

Figure 10:
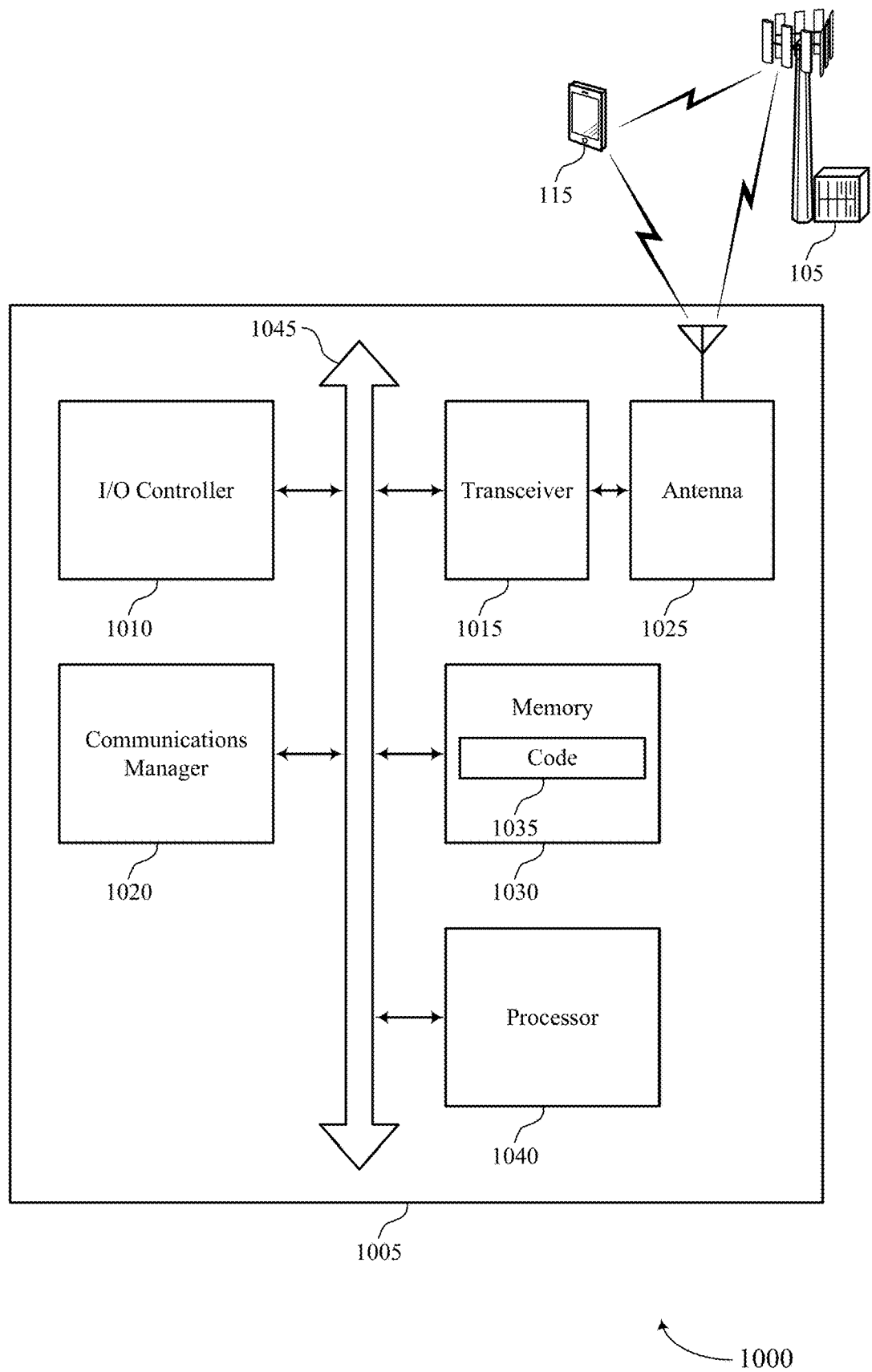
FIG. 10 shows a diagram of a system including a device that supports resource information forwarding for distributed sidelink in accordance with aspects of the present disclosure.

FIG. 10 shows a diagram of a system 1000 including a device 1005 that supports resource information forwarding for distributed sidelink in accordance with aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting resource information forwarding for distributed sidelink). For example, the device 1005 or a component of the device 1005 may include a processor 1040 and memory 1030 coupled to the processor 1040, the processor 1040 and memory 1030 configured to perform various functions described herein.

The communications manager 1020 may support wireless communication at a first UE in accordance with examples as disclosed herein. For example, the communications manager 1020 may be configured as or otherwise support a means for determining a maximum size of a resource information forwarding message to be transmitted to a second UE over a sidelink channel, the resource information forwarding message indicating at least a set of sidelink resources reserved by a third UE. The communications manager 1020 may be configured as or otherwise support a means for generating the resource information forwarding message in accordance with the determined maximum size. The communications manager 1020 may be configured as or otherwise support a means for transmitting the generated resource information forwarding message to the second UE over the sidelink channel.

Additionally, or alternatively, the communications manager 1020 may support wireless communication at a UE in accordance with examples as disclosed herein. For example, the communications manager 1020 may be configured as or otherwise support a means for generating, for transmission on sidelink resources, a packet including an indication that the UE supports resource information forwarding. The communications manager 1020 may be configured as or otherwise support a means for transmitting the generated packet with the indication that the UE supports resource information forwarding.

By including or configuring the communications manager 1020 in accordance with examples as described herein, the device 1005 may support techniques for reduced processing, reduced power consumption, and more efficient utilization of communication resources. Because a maximum size of resource information forwarding messages may be regulated, UEs may waste less resources exchanging resource information forwarding messages when these messages are less useful in coordinating sidelink communications. Further, because the overhead and usefulness of resource information forwarding messages may be balanced, the UEs may waste less processing time and processing power on processing resource information forwarding messages when these messages are less useful in coordinating sidelink communications.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of resource information forwarding for distributed sidelink as described herein, or the processor 1040 and the memory 1030 may be otherwise configured to perform or support such operations.

Figure 11:
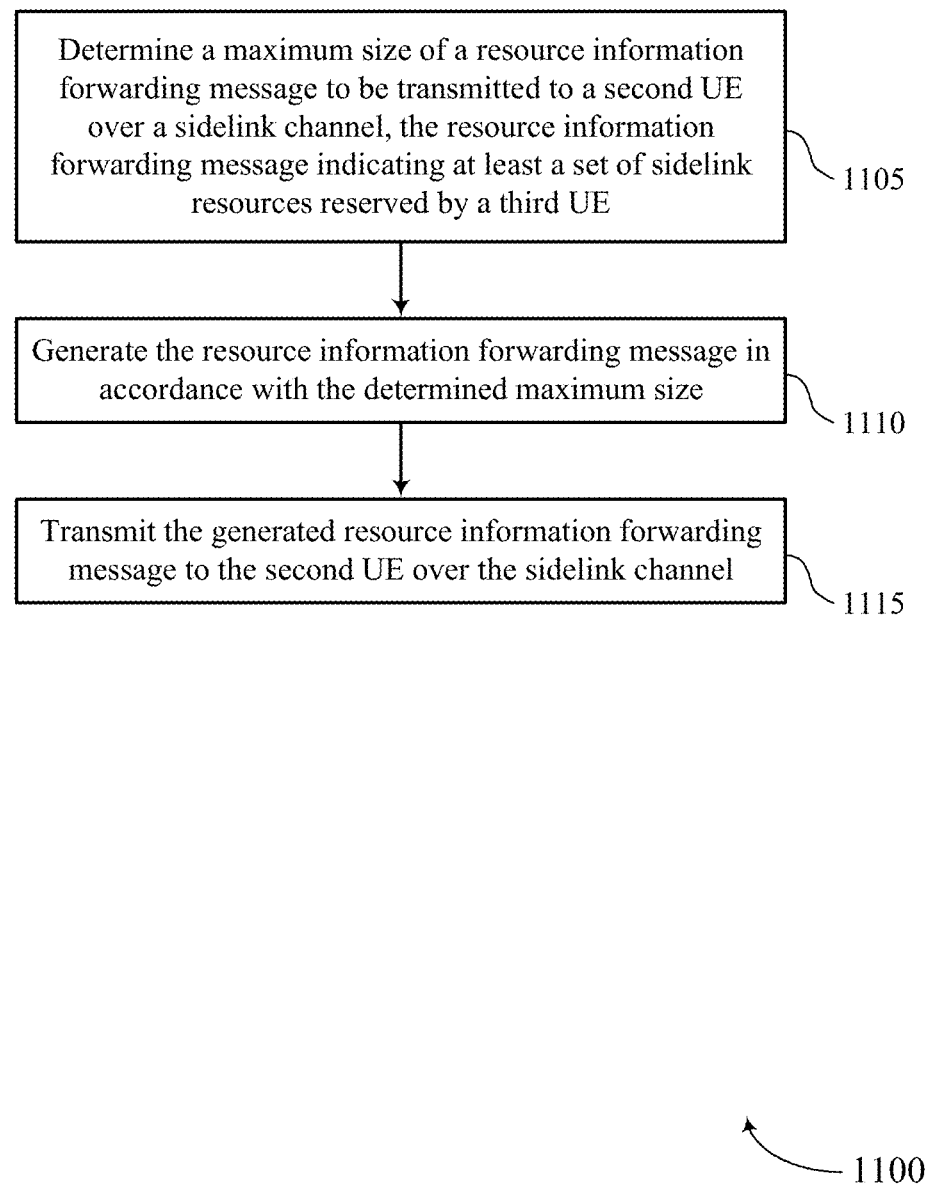
FIGS. 11 and 12 show flowcharts illustrating methods that support resource information forwarding for distributed sidelink in accordance with aspects of the present disclosure.

FIG. 11 shows a flowchart illustrating a method 1100 that supports resource information forwarding for distributed sidelink in accordance with aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include determining a maximum size of a resource information forwarding message to be transmitted to a second UE over a sidelink channel, the resource information forwarding message indicating at least a set of sidelink resources reserved by a third UE. The operations of 1105 may be performed in accordance with examples as disclosed herein. In some examples, aspects of the operations of 1105 may be performed by a message size manager 925 as described with reference to FIG. 9.

At 1110, the method may include generating the resource information forwarding message in accordance with the determined maximum size. The operations of 1110 may be performed in accordance with examples as disclosed herein. In some examples, aspects of the operations of 1110 may be performed by a resource information forwarding message manager 930 as described with reference to FIG. 9.

At 1115, the method may include transmitting the generated resource information forwarding message to the second UE over the sidelink channel. The operations of 1115 may be performed in accordance with examples as disclosed herein. In some examples, aspects of the operations of 1115 may be performed by a resource information forwarding message manager 930 as described with reference to FIG. 9.

Figure 12:
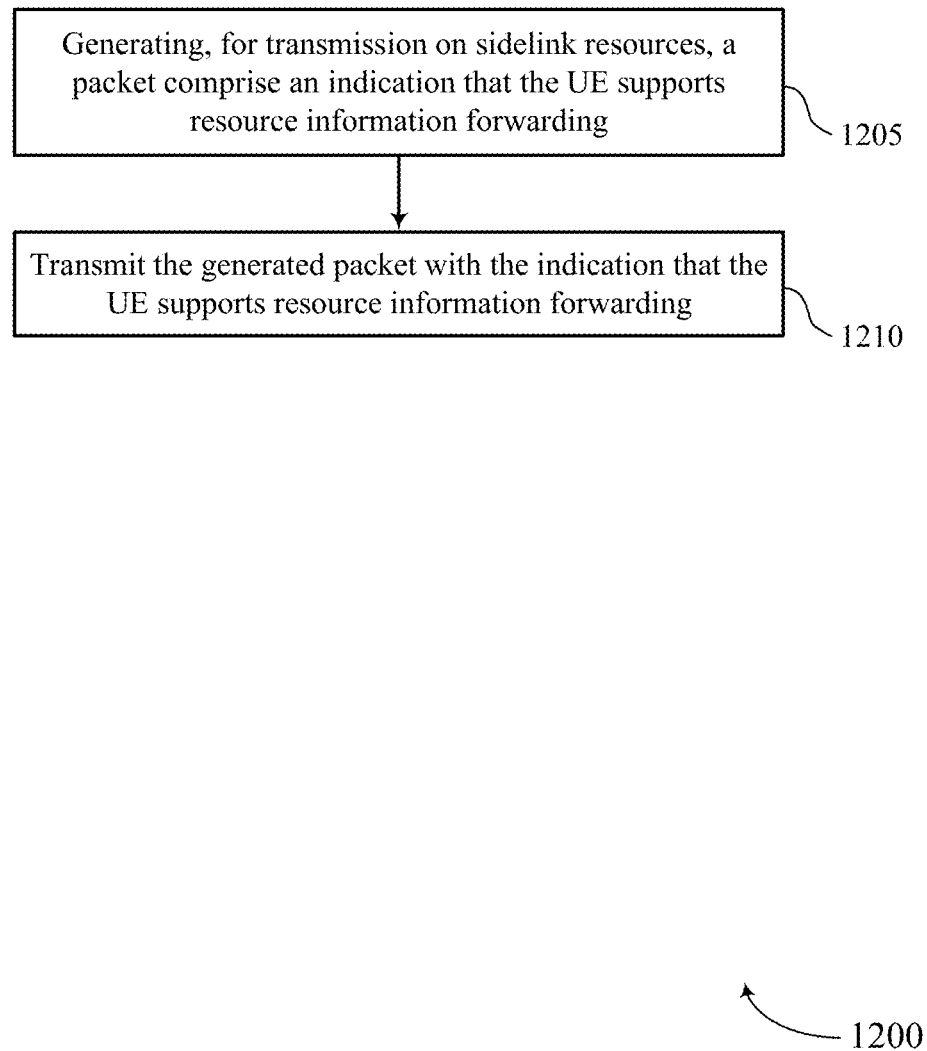

FIG. 12 shows a flowchart illustrating a method 1200 that supports resource information forwarding for distributed sidelink in accordance with aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include generating, for transmission on sidelink resources, a packet including an indication that the UE supports resource information forwarding. The operations of 1205 may be performed in accordance with examples as disclosed herein. In some examples, aspects of the operations of 1205 may be performed by a packet manager 935 as described with reference to FIG. 9.

At 1210, the method may include transmitting the generated packet with the indication that the UE supports resource information forwarding. The operations of 1210 may be performed in accordance with examples as disclosed herein. In some examples, aspects of the operations of 1210 may be performed by a packet manager 935 as described with reference to FIG. 9.

The following provides an overview of aspects of the present disclosure:

Aspect 1: A method for wireless communication at a first UE, comprising: determining a maximum size of a resource information forwarding message to be transmitted to a second UE over a sidelink channel, the resource information forwarding message indicating at least a set of sidelink resources reserved by a third UE; generating the resource information forwarding message in accordance with the determined maximum size; and transmitting the generated resource information forwarding message to the second UE over the sidelink channel.

Aspect 2: The method of aspect 1, further comprising: receiving, from the third UE, a sidelink control information message indicating the set of sidelink resources reserved by the third UE, wherein transmitting the resource information forwarding message to the second UE comprises forwarding the set of sidelink resources reserved by the third UE to the second UE.

Aspect 3: The method of any of aspects 1 through 2, wherein determining the maximum size of the resource information forwarding message comprises:

determining the maximum size of the resource information forwarding message based at least in part on a quantity of periodic reservations made by one or more UEs in a sensing window, a ratio of UEs supporting resource information forwarding and other UEs not supporting resource information forwarding detected in the sensing window, a congestion metric calculated based at least in part on the sensing window, or a combination thereof.

Aspect 4: The method of aspect 3, wherein determining the maximum size of the resource information forwarding message comprises: adapting a preconfigured maximum size of the resource information forwarding message to determine the maximum size of the resource information forwarding message based at least in part on the quantity of periodic reservations, the ratio of UEs supporting resource information forwarding and other UEs not supporting resource information forwarding, the congestion metric, or a combination thereof.

Aspect 5: The method of any of aspects 3 through 4, further comprising: performing sensing during the sensing window; and determining the quantity of periodic reservations made by the one or more UEs, the ratio of UEs supporting resource information forwarding and other UEs not supporting resource information forwarding, or the congestion metric based at least in part on performing the sensing during the sensing window, historical information on device capabilities, traffic pattern information, or a combination thereof.

Aspect 6: The method of any of aspects 3 through 5, further comprising: calculating the congestion metric based at least in part on measurements performed on sidelink resources in the sensing window or measurements performed on a subset of the sidelink resources in the sensing window dedicated for resource information forwarding measurements.

Aspect 7: The method of any of aspects 3 through 6, further comprising: receiving control information from the UEs supporting resource information forwarding indicating that the UEs support resource information forwarding; and determining the ratio of the UEs supporting resource information forwarding and other UEs not supporting resource information forwarding based at least in part on receiving the control information.

Aspect 8: The method of aspect 7, wherein the control information comprises sidelink control information or a medium access control (MAC) control element (CE).

Aspect 9: The method of any of aspects 3 through 8, further comprising: receiving a packet from each UE supporting resource information forwarding, the packet comprising a layer-2 identifier indicating that the UE supports resource information forwarding.

Aspect 10: The method of aspect 9, wherein the layer-2 identifier is from a set of layer-2 identifiers available to UEs supporting resource information forwarding.

Aspect 11: The method of any of aspects 9 through 10, wherein the layer-2 identifier is a part of an upper-layer configuration or is preconfigured at UEs supporting resource information forwarding.

Aspect 12: The method of any of aspects 1 through 11, wherein the maximum size of the resource information forwarding message is preconfigured at the first UE.

Aspect 13: The method of any of aspects 1 through 12, further comprising: receiving one or more sidelink control information messages indicating one or more sets of sidelink resources reserved by one or more UEs, the one or more sets of sidelink resources including the set of sidelink resources reserved by the third UE.

Aspect 14: The method of aspect 13, wherein generating the resource information forwarding message comprises: sorting the one or more sets of sidelink resources reserved by the one or more UEs; and generating the resource information forwarding message to indicate at least a first one or more sets of sidelink resources of the sorted sets of sidelink resources.

Aspect 15: The method of aspect 14, wherein sorting the one or more sets of sidelink resources comprises: sorting the one or more sets of sidelink resources reserved by the one or more UEs based at least in part on a time at which each set of sidelink resources is reserved, a signal strength or quality metric of each sidelink control information message reserving a corresponding set of sidelink resources, a distance between the first UE and a UE of the one or more UEs reserving each set of sidelink resources, or a combination thereof.

Aspect 16: The method of any of aspects 1 through 15, wherein generating the resource information forwarding message identifying resources allocated for transmitting the resource information forwarding message to the second UE; and adapting a modulation and coding scheme for generating the resource information forwarding message based at least in part on the resources allocated or pre-allocated for transmitting the resource information forwarding message to the second UE.

Aspect 17: The method of any of aspects 1 through 16, wherein generating the resource information forwarding message generating the resource information forwarding message using a fixed modulation and coding scheme, the method further comprising: adapting a quantity of resources for transmitting the resource information forwarding message to the second UE based at least in part on generating the resource information forwarding message using the fixed modulation and coding scheme.

Aspect 18: The method of any of aspects 1 through 17, wherein generating the resource information forwarding message generating the resource information forwarding message based at least in part on a fixed, maximum modulation and coding scheme, the method further comprising: adapting a quantity of resources for transmitting the resource information forwarding message to the second UE based at least in part on generating the resource information forwarding message based at least in part on the fixed, maximum modulation and coding scheme.

Aspect 19: The method of any of aspects 1 through 18, further comprising: receiving a request from the second UE for the resource information forwarding message, wherein transmitting the resource information forwarding message to the second UE is based at least in part on receiving the request.

Aspect 20: The method of any of aspects 1 through 19, wherein transmitting the resource information forwarding message to the second UE comprises: autonomously transmitting the resource information forwarding message to the second UE.

Aspect 21: A method for wireless communication at a UE, comprising: generating, for transmission on sidelink resources, a packet comprising an indication that the UE supports resource information forwarding; and transmitting the generated packet with the indication that the UE supports resource information forwarding.

Aspect 22: The method of aspect 21, wherein transmitting the packet with the indication that the UE supports resource information forwarding comprises: transmitting control information in the packet indicating that the UE supports resource information forwarding.

Aspect 23: The method of aspect 22, wherein the control information comprises sidelink control information or a medium access control (MAC) control element (CE).

Aspect 24: The method of any of aspects 21 through 23, wherein transmitting the packet with the indication that the UE supports resource information forwarding comprises: transmitting a layer-2 identifier in the packet indicating that the UE supports resource information forwarding.

Aspect 25: The method of aspect 24, wherein the layer-2 identifier is from a set of layer-2 identifiers available to UEs supporting resource information forwarding.

Aspect 26: The method of any of aspects 24 through 25, wherein the layer-2 identifier is a part of an upper-layer configuration at the UE or is preconfigured at the UE based at least in part on the UE supporting resource information forwarding.

Aspect 27: An apparatus for wireless communication at a first UE, comprising a processor; memory coupled with the processor; and instructions stored in the memory and executable by the processor to cause the apparatus to perform a method of any of aspects 1 through 20.

Aspect 28: An apparatus for wireless communication at a first UE, comprising at least one means for performing a method of any of aspects 1 through 20.

Aspect 29: A non-transitory computer-readable medium storing code for wireless communication at a first UE, the code comprising instructions executable by a processor to perform a method of any of aspects 1 through 20.

Aspect 30: An apparatus for wireless communication at a UE, comprising a processor; memory coupled with the processor; and instructions stored in the memory and executable by the processor to cause the apparatus to perform a method of any of aspects 21 through 26.

Aspect 31: An apparatus for wireless communication at a UE, comprising at least one means for performing a method of any of aspects 21 through 26.

Aspect 32: A non-transitory computer-readable medium storing code for wireless communication at a UE, the code comprising instructions executable by a processor to perform a method of any of aspects 21 through 26.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database, or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first user equipment (UE), comprising:
   determining a maximum size of a resource information forwarding message to be transmitted to a second UE over a sidelink channel, the resource information forwarding message indicating at least a set of sidelink resources reserved by a third UE;
   generating the resource information forwarding message in accordance with the determined maximum size; and
   transmitting the generated resource information forwarding message to the second UE over the sidelink channel.

2. The method of claim 1, further comprising:
   receiving, from the third UE, a sidelink control information message indicating the set of sidelink resources reserved by the third UE, wherein transmitting the resource information forwarding message to the second UE comprises forwarding the set of sidelink resources reserved by the third UE to the second UE.

3. The method of claim 1, wherein determining the maximum size of the resource information forwarding message comprises:
   determining the maximum size of the resource information forwarding message based at least in part on a quantity of periodic reservations made by one or more UEs in a sensing window, a ratio of UEs supporting resource information forwarding and other UEs not supporting resource information forwarding detected in the sensing window, a congestion metric calculated based at least in part on the sensing window, or a combination thereof.

4. The method of claim 3, wherein determining the maximum size of the resource information forwarding message comprises:
adapting a preconfigured maximum size of the resource information forwarding message to determine the maximum size of the resource information forwarding message based at least in part on the quantity of periodic reservations, the ratio of UEs supporting resource information forwarding and other UEs not supporting resource information forwarding, the congestion metric, or a combination thereof.

5. The method of claim 3, further comprising:
performing sensing during the sensing window; and
determining the quantity of periodic reservations made by the one or more UEs, the ratio of UEs supporting resource information forwarding and other UEs not supporting resource information forwarding, or the congestion metric based at least in part on performing the sensing during the sensing window, historical information on device capabilities, traffic pattern information, or a combination thereof.

6. The method of claim 3, further comprising:
calculating the congestion metric based at least in part on measurements performed on sidelink resources in the sensing window or measurements performed on a subset of the sidelink resources in the sensing window dedicated for resource information forwarding measurements.

7. The method of claim 3, further comprising:
receiving control information from the UEs supporting resource information forwarding indicating that the UEs support resource information forwarding; and
determining the ratio of the UEs supporting resource information forwarding and other UEs not supporting resource information forwarding based at least in part on receiving the control information.

8. The method of claim 7, wherein the control information comprises sidelink control information or a medium access control (MAC) control element (CE).

9. The method of claim 3, further comprising:
receiving a packet from each UE supporting resource information forwarding, the packet comprising a layer-2 identifier indicating that the UE supports resource information forwarding.

10. The method of claim 9, wherein the layer-2 identifier is from a set of layer-2 identifiers available to UEs supporting resource information forwarding.

11. The method of claim 9, wherein the layer-2 identifier is a part of an upper-layer configuration or is preconfigured at UEs supporting resource information forwarding.

12. The method of claim 1, wherein the maximum size of the resource information forwarding message is preconfigured at the first UE.

13. The method of claim 1, further comprising:
receiving one or more sidelink control information messages indicating one or more sets of sidelink resources reserved by one or more UEs, the one or more sets of sidelink resources including the set of sidelink resources reserved by the third UE.

14. The method of claim 13, wherein generating the resource information forwarding message comprises:
sorting the one or more sets of sidelink resources reserved by the one or more UEs; and
generating the resource information forwarding message to indicate at least a first one or more sets of sidelink resources of the sorted sets of sidelink resources.

15. The method of claim 14, wherein sorting the one or more sets of sidelink resources comprises:
sorting the one or more sets of sidelink resources reserved by the one or more UEs based at least in part on a time at which each set of sidelink resources is reserved, a signal strength or quality metric of each sidelink control information message reserving a corresponding set of sidelink resources, a distance between the first UE and a UE of the one or more UEs reserving each set of sidelink resources, or a combination thereof.

16. The method of claim 1, wherein generating the resource information forwarding message comprises:
identifying resources allocated for transmitting the resource information forwarding message to the second UE; and
adapting a modulation and coding scheme for generating the resource information forwarding message based at least in part on the resources allocated or pre-allocated for transmitting the resource information forwarding message to the second UE.

17. The method of claim 1, wherein generating the resource information forwarding message comprises:
generating the resource information forwarding message using a fixed modulation and coding scheme, the method further comprising:
adapting a quantity of resources for transmitting the resource information forwarding message to the second UE based at least in part on generating the resource information forwarding message using the fixed modulation and coding scheme.

18. The method of claim 1, wherein generating the resource information forwarding message comprises:
generating the resource information forwarding message based at least in part on a fixed, maximum modulation and coding scheme, the method further comprising:
adapting a quantity of resources for transmitting the resource information forwarding message to the second UE based at least in part on generating the resource information forwarding message based at least in part on the fixed, maximum modulation and coding scheme.

19. The method of claim 1, further comprising:
receiving a request from the second UE for the resource information forwarding message, wherein transmitting the resource information forwarding message to the second UE is based at least in part on receiving the request.

20. The method of claim 1, wherein transmitting the resource information forwarding message to the second UE comprises:
autonomously transmitting the resource information forwarding message to the second UE.

21. A method for wireless communication at a user equipment (UE), comprising:
generating, for transmission on sidelink resources, a packet comprising an indication that the UE supports resource information forwarding; and
transmitting the generated packet with the indication that the UE supports resource information forwarding wherein the generated packet comprises at least a layer-2 identifier in the packet indicating that the UE supports resource information forwarding wherein the layer-2 identifier is part of an upper-layer configuration at the UE or is preconfigured at the UE based at least in part on the UE supporting resource information forwarding.

22. The method of claim 21, wherein transmitting the packet with the indication that the UE supports resource information forwarding comprises:
transmitting control information in the packet indicating that the UE supports resource information forwarding.

23. The method of claim 22, wherein the control information comprises sidelink control information or a medium access control (MAC) control element (CE).

24. The method of claim 21, wherein the layer-2 identifier is from a set of layer-2 identifiers available to UEs supporting resource information forwarding.

25. An apparatus for wireless communication at a first user equipment (UE), comprising:
a processor;
memory coupled with the processor; and
instructions stored in the memory and executable by the processor to cause the apparatus to:
determine a maximum size of a resource information forwarding message to be transmitted to a second UE over a sidelink channel, the resource information forwarding message indicating at least a set of sidelink resources reserved by a third UE;
generate the resource information forwarding message in accordance with the determined maximum size; and
transmit the generated resource information forwarding message to the second UE over the sidelink channel.

26. The apparatus of claim 25, wherein the instructions are further executable by the processor to cause the apparatus to:
receive, from the third UE, a sidelink control information message indicating the set of sidelink resources reserved by the third UE, wherein the instructions to transmit the resource information forwarding message to the second UE are further executable by the processor to cause the apparatus to forward the set of sidelink resources reserved by the third UE to the second UE.

27. The apparatus of claim 25, wherein the instructions to determine the maximum size of the resource information forwarding message are further executable by the processor to cause the apparatus to:
determine the maximum size of the resource information forwarding message based at least in part on a quantity of periodic reservations made by one or more UEs in a sensing window, a ratio of UEs supporting resource information forwarding and other UEs not supporting resource information forwarding detected in the sensing window, a congestion metric calculated based at least in part on the sensing window, or a combination thereof.

28. An apparatus for wireless communication at a user equipment (UE), comprising:
a processor;
memory coupled with the processor; and
instructions stored in the memory and executable by the processor to cause the apparatus to:
generate, for transmission on sidelink resources, a packet comprising an indication that the UE supports resource information forwarding; and
transmit the generated packet with the indication that the UE supports resource information forwarding wherein the generated packet comprises at least a layer-2 identifier in the packet indicating that the UE supports resource information forwarding wherein the layer-2 identifier is part of an upper-layer configuration at the UE or is preconfigured at the UE based at least in part on the UE supporting resource information forwarding.

* * * * *